US010890907B2

(12) United States Patent
Lu

(10) Patent No.: US 10,890,907 B2
(45) Date of Patent: Jan. 12, 2021

(54) VEHICLE COMPONENT MODIFICATION BASED ON VEHICULAR ACCIDENT RECONSTRUCTION DATA

(71) Applicant: TOYOTA JIDOSHA KABUSHIKI KAISHA, Toyota (JP)

(72) Inventor: Hongsheng Lu, Mountain View, CA (US)

( * ) Notice: Subject to any disclaimer, the term of this patent is extended or adjusted under 35 U.S.C. 154(b) by 37 days.

(21) Appl. No.: 16/220,717

(22) Filed: Dec. 14, 2018

(65) Prior Publication Data
US 2020/0192355 A1 Jun. 18, 2020

(51) Int. Cl.
*G05D 1/00* (2006.01)
*G07C 5/00* (2006.01)
(Continued)

(52) U.S. Cl.
CPC .......... *G05D 1/0055* (2013.01); *B60W 30/08* (2013.01); *G05D 1/0088* (2013.01); *G07C 5/008* (2013.01); *H04W 4/40* (2018.02); *B60W 2050/008* (2013.01); *B60W 2556/65* (2020.02); *G05D 2201/0213* (2013.01); *G08G 1/0967* (2013.01);
(Continued)

(58) Field of Classification Search
CPC ....... G08G 1/096791; G08G 1/096827; G08G 1/096844; G08G 1/096725; G08G 1/096758; G08G 1/0112; G08G 1/0129; G08G 1/07; G08G 1/096783; G08G 1/162; G08G 1/163; G08G 1/164; G08G 1/166; G08G 1/095; G08G 1/09623; G08G 1/0967; G06K 7/12; G06K 9/00805; G06K 19/0614; G06K 19/06084; G06K 9/00818; G05D 1/0055; G05D 1/0088; G05D 2201/0213; H04W 4/024; H04W 4/02; H04W 4/46; H04W 4/44; H04W 4/40; G07C 5/02; G07C 5/0816; G07C 5/008; B60Q 9/008; G06Q 50/00; G06Q 40/08; B60T 7/22; G01S 17/931; B62D 15/025;
(Continued)

(56) References Cited

U.S. PATENT DOCUMENTS 7,359,821 B1 * 4/2008 Smith ................... G07C 5/002
702/113
9,805,601 B1 * 10/2017 Fields .............. G08G 1/096844
(Continued)

*Primary Examiner* — Behrang Badii
(74) *Attorney, Agent, or Firm* — Burbage Law, P.C.; Jon-Michael Burbage; Elizabeth Ruzich

(57) ABSTRACT

The disclosure describes embodiments for modifying a vehicle control system of a connected vehicle based on a Vehicular Accident Reconstruction (VAR) analysis. In some embodiments, a method includes detecting an occurrence of a collision associated with a remote vehicle; generating report data associated with the collision, where the report data includes one or more of Vehicle-to-Everything (V2X) data describing V2X wireless messages received prior to detecting the occurrence of the collision and event data describing one or more driving events observed by an ego vehicle; transmitting the report data to a server; receiving modification data that describes a modification for a vehicle control system of the ego vehicle from the server, where the modification data is generated based on the report data through a VAR analysis; and modifying an operation of the vehicle control system based on the modification data to improve safety of the ego vehicle.

20 Claims, 13 Drawing Sheets

(51) Int. Cl.
*H04W 4/40* (2018.01)
*B60W 30/08* (2012.01)
*B60W 50/00* (2006.01)
*H04W 4/024* (2018.01)
*G08G 1/0967* (2006.01)

(52) U.S. Cl.
CPC ....... *G08G 1/096791* (2013.01); *H04W 4/024* (2018.02)

(58) Field of Classification Search
CPC ..... E01F 9/30; B60W 30/08; B60W 2556/65; B60W 2050/008
See application file for complete search history.

(56) References Cited

U.S. PATENT DOCUMENTS

| | | | |
|---|---|---|---|
| 10,042,359 B1* | 8/2018 | Konrardy | G05D 1/0255 |
| 10,145,684 B1* | 12/2018 | Tofte | G06Q 40/08 |
| 2003/0130893 A1* | 7/2003 | Farmer | G06Q 30/0266 |
| | | | 705/14.63 |
| 2003/0182035 A1* | 9/2003 | DiLodovico | G08G 1/164 |
| | | | 701/32.2 |
| 2004/0122639 A1* | 6/2004 | Qiu | G07C 5/085 |
| | | | 703/8 |
| 2006/0106538 A1* | 5/2006 | Browne | B60R 21/01 |
| | | | 701/301 |
| 2014/0295885 A1* | 10/2014 | Marko | H04W 76/50 |
| | | | 455/456.1 |
| 2015/0019098 A1* | 1/2015 | Schrabler | G06K 7/12 |
| | | | 701/70 |
| 2019/0007484 A1* | 1/2019 | Chen | H04W 4/40 |
| 2019/0082300 A1* | 3/2019 | Watkins | H04W 4/029 |
| 2019/0364492 A1* | 11/2019 | Azizi | H04W 48/10 |

* cited by examiner

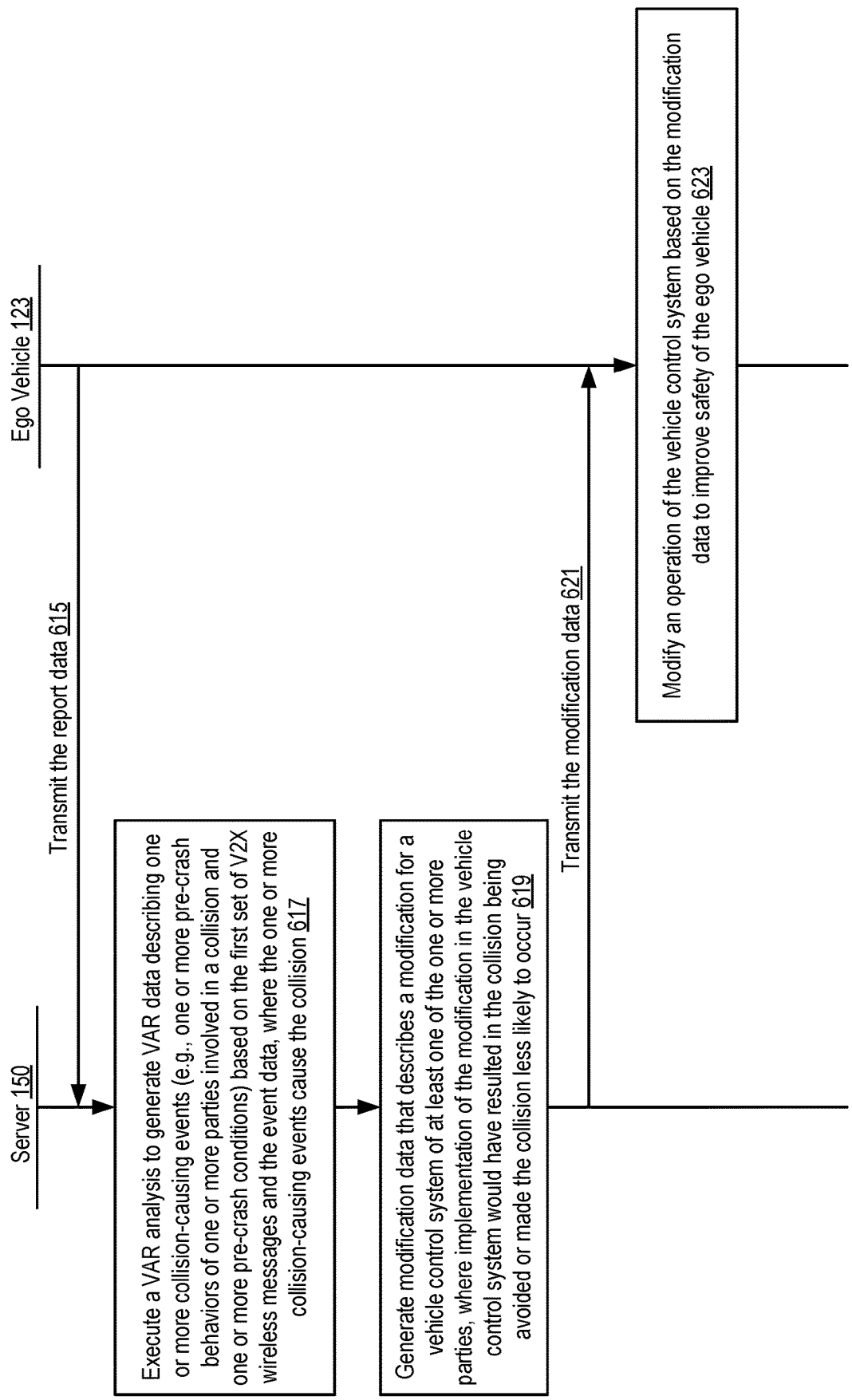

BSM DATA 700

- Vehicles and other client devices equipped with Dedicated Short Range Communication ("DSRC") transmit a Basic Safety Message ("BSM") at a regular interval (e.g., 10 times per second).

- Each BSM includes the following BSM data describing one or more of the following for the vehicle that originally sent the BSM:
    (1) Location Data Describing the Location of the Vehicle, where the Location Data may be so accurate that it describes the specific lane the Vehicle is traveling in;
    (2) Heading Data Describing the Direction of travel for the Vehicle;
    (3) Velocity Data Describing the Velocity of the Vehicle; and
    (4) Path History of Vehicle (e.g., path history data).

Figure 7A

BSM Data 750

Part 1
Sensor Data including:
(1) GPS Data (local 3D)
- Latitude
- Longitude
- Elevation
- Positional accuracy
- Time (2) Vehicle Motion Data
- Transmission state
- Speed
- Heading
- Steering wheel angle
- Acceleration set (4-way), i.e., 3 axes of acceleration plus yaw rate
- Brake system status Vehicle Size Data

Part 2
Vehicle Path History
Future Vehicle Path Estimation
Hard Active Braking
Traction Control System active over 100 milliseconds
Antilock Brake System active over 100 milliseconds
Light Status
Wiper Status
Vehicle type

Figure 7B

VEHICLE COMPONENT MODIFICATION BASED ON VEHICULAR ACCIDENT RECONSTRUCTION DATA

BACKGROUND

The specification relates to modifying a vehicle control system of a connected vehicle based on a result of a vehicular accident reconstruction (VAR) analysis so that safety of the connected vehicle is improved.

The VAR analysis is a scientific process of investigating, analyzing, and drawing conclusions about causes and events during a vehicle accident such as a collision. Reconstructionists are humans that are employed to conduct in-depth collision analysis and reconstruction to identify collision causation and contributing factors in different types of collisions. The process of VAR is a labor and time-intensive process.

Usually, vehicles involved in collisions react too late. If the vehicles have reacted promptly and properly in advance before the collisions, these collisions may have been avoided. However, it can be difficult to determine how to control the vehicles to react in advance to avoid collisions or to reduce a likelihood of occurrence of the collisions.

SUMMARY

Described herein are embodiments of (1) a feedback system that is installed in an electronic control unit (ECU) of an ego vehicle and (2) an analysis system that is installed in a server. The feedback system and the analysis system described herein cooperate with one another to provide an easier and more accurate VAR analysis and then to modify a vehicle control system of the ego vehicle based on a result of the VAR analysis to improve safety of the ego vehicle. For example, the feedback system and the analysis system cooperate with one another to use Vehicle-to-Everything (V2X) data (e.g., Basic Safety Message (BSM) data), as well as sensor data recorded by the ego vehicle which is proximate to a crash (e.g., image data captured by camera sensors of the ego vehicle), to provide an easier and more accurate VAR analysis for the crash.

By comparison, existing solutions are inadequate because, for example, they do not use BSMs and V2X communications to improve VAR. These existing solutions also do not provide feedback that is used to modify a vehicle control system of a vehicle to improve safety of the vehicle. For example, there is no existing solution that uses the BSM data included in BSMs as a form of feedback that is used to improve a VAR analysis. In another example, there is no existing solution that uses a VAR analysis performed using BSM data to generate improved designs for future Advanced Driver Assistance Systems (ADAS systems) and autonomous driving systems, as well as software patches for existing ADAS systems and autonomous driving systems, to reduce the number of collisions that occur and thereby improve driver safety.

In some embodiments described herein, the ego vehicle and the server communicate with one another via a wireless network. The ego vehicle is a connected vehicle. The feedback system installed in the ego vehicle uses Basic Safety Messages (BSMs) received from nearby remote vehicles to identify a presence of a pre-crash event for one of the remote vehicles. The feedback system causes onboard cameras and other sensors of the ego vehicle to monitor whether a collision occurs and to record driving events (e.g., pre-crash conditions, pre-crash behaviors or a combination thereof) which cause or lead to the collision; and this includes the capture of images of the driving events using onboard external cameras. The feedback system generates report data that includes (1) event data describing the driving events and (2) the BSM data from the BSMs. The feedback system provides the report data to the analysis system of the server.

The analysis system uses the report data to conduct a VAR analysis which yields VAR data. The VAR data describes collision-causing events that result in the collision, in particular, the pre-crash behavior(s) of a driver or an autonomous driving system that cause the accident. The VAR data may then be used as feedback that may be used to improve a design of Advanced Driver Assistance Systems (ADAS systems) or autonomous driving systems so that collisions are reduced by these systems. This feedback may also be used to generate and provide software patches for existing ADAS systems or autonomous driving systems so that these existing systems can avoid more collisions.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a method for an ego vehicle including: detecting an occurrence of a collision associated with a remote vehicle; generating report data associated with the collision of the remote vehicle, where the report data includes one or more of V2X data describing a first set of V2X wireless messages received prior to detecting the occurrence of the collision and event data describing one or more driving events that are observed by the ego vehicle; transmitting the report data to a server; receiving modification data that describes a modification for a vehicle control system of the ego vehicle from the server, where the modification data is generated based on the report data through a vehicular accident reconstruction analysis; and modifying an operation of the vehicle control system based on the modification data to improve safety of the ego vehicle. Other embodiments of this aspect include corresponding computer systems, apparatus, and computer programs recorded on one or more computer storage devices, each configured to perform the actions of the methods.

Implementations may include one or more of the following features. The method where the vehicle control system includes one of an Advanced Driver Assistance System (ADAS system) and an autonomous driving system. The method where the ego vehicle is an autonomous vehicle and where modifying the operation of the vehicle control system based on the modification data includes: modifying a safety process of the autonomous vehicle which is provided by the autonomous driving system based on the modification data to increases safety of the autonomous vehicle. The method where modifying the operation of the vehicle control system based on the modification data includes: modifying one or more operations of one or more of a braking system, a steering system and an acceleration system of the ego vehicle based on the modification data, where the one or more operations are controlled by the ADAS system. The method where prior to detecting the occurrence of the collision, the method further includes: identifying a presence of a pre-crash event associated with the remote vehicle based on a first V2X wireless message received from the remote vehicle; and responsive to identifying the presence of the pre-crash event, causing one or more sensors of the ego vehicle to record sensor data, generating the event data describing the one or more driving events based on the sensor data, and monitoring the remote vehicle to continue receiving one or more second V2X wireless messages from the remote vehicle prior to detecting the occurrence of the collision, where the first set of V2X wireless messages included in the report data includes the first V2X wireless message and the one or more second V2X wireless messages. The method where identifying the presence of the pre-crash event associated with the remote vehicle includes: receiving an initial set of V2X wireless messages from a set of remote vehicles via a network, where the initial set of V2X wireless messages includes the first V2X wireless message from the remote vehicle; and analyzing the initial set of V2X wireless messages to identify that the first V2X wireless message includes data indicating the pre-crash event associated with the remote vehicle. The method where detecting the occurrence of the collision associated with the remote vehicle includes: detecting that the collision occurs to the remote vehicle based on one or more of the event data and the one or more second V2X wireless messages. The method where the event data includes remote-vehicle behavior data describing one or more behaviors of the remote vehicle that are observed by the ego vehicle, and generating the event data describing the one or more driving events based on the sensor data further includes: generating the remote-vehicle behavior data describing the one or more behaviors of the remote vehicle based on the sensor data. The method where the one or more behaviors of the remote vehicle include one or more pre-crash behaviors of the remote vehicle that are observed by the ego vehicle. The method where prior to detecting the occurrence of the collision, the method further includes: analyzing the sensor data to determine that the pre-crash event involves the remote vehicle and an endpoint; and monitoring the endpoint to receive one or more third V2X wireless messages from the endpoint. The method where generating the event data describing the one or more driving events based on the sensor data further includes: generating, based on the sensor data, endpoint behavior data describing one or more behaviors of the endpoint that are observed by the ego vehicle. The method further including: determining that the endpoint is involved in the collision with the remote vehicle based on one or more of the one or more third V2X wireless messages and the endpoint behavior data, where the first set of V2X wireless messages included in the report data further includes the one or more third V2X wireless messages from the endpoint, and where the event data included in the report data further includes the endpoint behavior data. The method where the one or more behaviors of the endpoint include one or more pre-crash behaviors of the endpoint that are observed by the ego vehicle. The method where the event data included in the report data further includes one or more pre-crash conditions that are observed by the ego vehicle. The method where each of the first set of V2X wireless messages is selected from a group that consists of: a Dedicated Short-Range Communication message; a Basic Safety Message; a Long-Term Evolution (LTE) message; a LTE-V2X message; a 5G-V2X message; and a millimeter wave message. Implementations of the described techniques may include hardware, a method or process, or computer software on a computer-accessible medium.

One general aspect includes a system including an onboard vehicle computer system of an ego vehicle, including a communication unit, a processor and a non-transitory memory storing computer code which, when executed by the processor causes the processor to: detect an occurrence of a collision associated with a remote vehicle; generate report data associated with the collision of the remote vehicle, where the report data includes one or more of V2X data describing a first set of V2X wireless messages received prior to detecting the occurrence of the collision and event data describing one or more driving events that are observed by the ego vehicle; transmit the report data to a server; receive modification data that describes a modification for a vehicle control system of the ego vehicle from the server, where the modification data is generated based on the report data through a vehicular accident reconstruction analysis; and modify an operation of the vehicle control system based on the modification data to improve safety of the ego vehicle. Other embodiments of this aspect include corresponding computer systems, apparatus, and computer programs recorded on one or more computer storage devices, each configured to perform the actions of the methods.

Implementations may include one or more of the following features. The system where the vehicle control system includes one of an ADAS system and an autonomous driving system. The system where the ego vehicle is an autonomous vehicle and the computer code, when executed by the processor, causes the processor to modify the operation of the vehicle control system based on the modification data at least by: modifying a safety process of the autonomous vehicle which is provided by the autonomous driving system based on the modification data to increases safety of the autonomous vehicle. The system where the computer code, when executed by the processor, causes the processor to modify the operation of the vehicle control system based on the modification data at least by: modifying one or more operations of one or more of a braking system, a steering system and an acceleration system of the ego vehicle based on the modification data, where the one or more operations are controlled by the ADAS system. Implementations of the described techniques may include hardware, a method or process, or computer software on a computer-accessible medium.

One general aspect includes a computer program product including instructions that, when executed by a processor, causes the processor to perform operations including: detecting an occurrence of a collision associated with a remote vehicle; generating report data associated with the collision of the remote vehicle, where the report data includes one or more of V2X data describing a first set of V2X wireless messages received prior to detecting the occurrence of the collision and event data describing one or more driving events that are observed by an ego vehicle; transmitting the report data to a server; receiving modification data that describes a modification for a vehicle control system of the ego vehicle from the server, where the modification data is generated based on the report data through a vehicular accident reconstruction analysis; and modifying an operation of the vehicle control system based on the modification data to improve safety of the ego vehicle. Other embodiments of this aspect include corresponding computer systems, apparatus, and computer programs recorded on one or more computer storage devices, each configured to perform the actions of the methods.

Implementations may include one or more of the following features. The computer program product where the vehicle control system includes an autonomous driving system, the ego vehicle is an autonomous vehicle, and the instructions, when executed by the processor, causes the processor to modify the operation of the vehicle control system based on the modification data at least by: modifying a safety process of the autonomous vehicle which is provided by the autonomous driving system based on the modification data to increases safety of the autonomous vehicle. Implementations of the described techniques may include hardware, a method or process, or computer software on a computer-accessible medium.

BRIEF DESCRIPTION OF THE DRAWINGS

The disclosure is illustrated by way of example, and not by way of limitation in the figures of the accompanying drawings in which like reference numerals are used to refer to similar elements.

FIGS. 6A-6B depict an example flow process for modifying a vehicle control system of a connected vehicle based on a result of a VAR analysis according to some embodiments.

FIGS. 7A and 7B are graphical representations illustrating example BSM data according to some embodiments.

DETAILED DESCRIPTION

Figure 1:
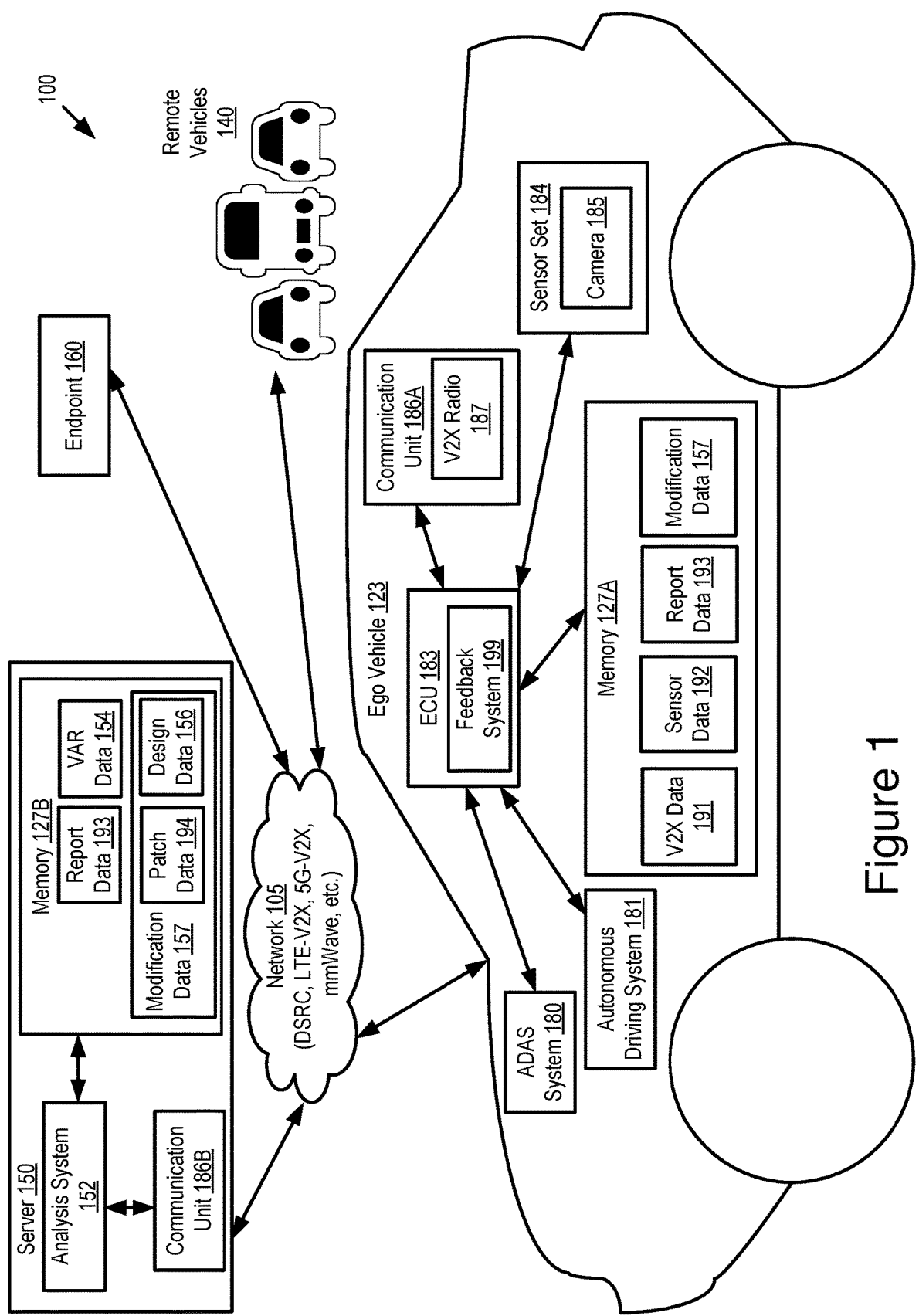
FIG. 1 is a block diagram illustrating an operating environment for a feedback system and an analysis system according to some embodiments.

In the United States, vehicles may soon be required to be equipped with Dedicated Short-Range Communication (DSRC). These vehicles are referred to as DSRC-equipped vehicles. A DSRC-equipped vehicle may include: (1) onboard sensors that are operable to record data describing a path history and kinematic information about the vehicle (e.g., a heading, a speed, braking patterns, etc.); and (2) a V2X radio that is operable to transmit DSRC messages, including a Basic Safety Message (BSM) which is transmitted at a user-configurable interval (default is once every 0.10 seconds) and includes BSM data that describes, among other things, path information and kinematic information about the vehicle.

Embodiments of a feedback system and an analysis system are now described. The feedback system and the analysis system cooperate with one another to use BSM data, as well as images captured by vehicles proximate to a crash, to provide an easier and more accurate VAR analysis. The BSM data describes, for example, pre-crash behaviors of vehicles involved in a collision. The images along with the BSM data depict the collision or driving events (e.g., pre-crash behaviors, pre-crash conditions, etc.) that precede the collision. The output of this VAR analysis may include VAR data that describes collision-causing events that result in the collision (e.g., the pre-crash behavior(s) of a driver or an autonomous driving system that causes the accident). The VAR data may then be used as feedback that may be used to improve a design of ADAS systems or autonomous driving systems so that collisions are reduced by these systems. This feedback may also be used to generate and provide software patches for existing ADAS systems or autonomous driving systems so that these existing systems can avoid more collisions.

Although some embodiments described herein are provided with reference to BSMs, the feedback system and the analysis system described herein may also work with any other type of V2X wireless messages and radio technologies (e.g., LTE-V2X, 5G-V2X, etc.).

In some embodiments, the feedback system is installed in an ECU of a connected vehicle. The feedback system includes code and routines that are operable, when executed by the ECU, to cause the ECU to execute one or more of the following operations:

(1) causing a V2X radio of the ego vehicle to receive BSMs transmitted by nearby remote vehicles;

(2) parsing BSM data from the received BSMs;

(3) for each BSM, analyzing path history data and vehicle kinematic data included in the BSM data to determine whether this data indicates a pre-crash behavior by a particular remote vehicle that transmits the BSM (for example, if a driver of a DSRC-equipped vehicle starts braking or maneuvering the wheels (to avoid a collision), its BSM data may reflect these behaviors);

(4) responsive to determining a presence of the pre-crash behavior, causing one or more sensors of the ego vehicle to record sensor data that is used to determine one or more pre-crash behaviors of the particular remote vehicle that transmits the BSM at operation (3) (e.g., causing one or more onboard cameras of the ego vehicle to record images of one or more pre-crash behaviors of the particular remote vehicle; and as operation (4) is occurring, the particular remote vehicle continues to transmit new BSMs to the ego vehicle at an interval such as once every 0.10 seconds);

(5) monitoring the new BSMs transmitted by the particular remote vehicle and the sensor data (e.g., images) which begin to be recorded at operation (4) to determine whether a collision actually occurs and, if so, determining a time when the collision occurs;

(6) responsive to determining that a collision actually occurs at operation (5), generating report data that includes (i) each instance of BSM data which is received prior to the time of the collision and (ii) the sensor data recorded before the time of the collision (in some embodiments, the sensor data is processed by the ego vehicle to generate event data describing one or more driving events that include one or more pre-crash behaviors or one or more pre-crash conditions, so that the report data includes the BSM data and the event data rather than the sensor data);

(7) transmitting the report data to a server via a wireless network at a time when the ego vehicle is serviced by a dealer or at a time when the ego vehicle is connected to the wireless network;

(8) receiving patch data from the server that describes a software patch for an ADAS system of the ego vehicle or an autonomous driving system of the ego vehicle; and (9) installing the software patch in the ADAS system or the autonomous driving system of the ego vehicle so that the operation of the ADAS system or the autonomous driving system, as well as other vehicle components they control (e.g., a braking system, a steering system, etc.) is modified consistent with the software patch and responsive to providing the report data to the server.

The feedback system is further described below with reference to FIGS. 1-3A and 4A-6B.

In some embodiments, the analysis system installed in the server includes code and routines that are operable, when executed by a processor of the server, to cause the processor to execute one or more of the following operations:

(1) receiving report data from an ego vehicle for a particular collision;

(2) parsing the BSM data and the sensor data (e.g., image data) from the report data (in some embodiments, the report data includes the BSM data and the event data rather than the sensor data, and operation (2) here includes parsing the BSM data and the event data from the report data);

(3) for each collision, executing a VAR analysis to generate VAR data describing one or more collision-causing events that contribute to the collision (e.g., the pre-crash behavior(s) of one or more vehicles that cause the collision);

(4) for each collision, analyzing the VAR data to generate either design data or patch data that describes a modification for one or more ADAS systems or an autonomous driving system that would have resulted in the collision being avoided or made the collision less likely to occur; and (5) if patch data is generated at operation (4), providing the patch data to the ego vehicle and other vehicles that include the affected ADAS systems or autonomous driving system.

The analysis system is further described below with reference to FIGS. 1 and 3B.

As described herein, examples of V2X communications include, but are not limited to, one or more of the following: Dedicated Short Range Communication (DSRC) (including Basic Safety Messages (BSMs) and Personal Safety Messages (PSMs), among other types of DSRC communication); Long-Term Evolution (LTE); millimeter wave (mmWave) communication; 3G; 4G; 5G; LTE-V2X; 5G-V2X; LTE-Vehicle-to-Vehicle (LTE-V2V); LTE-Device-to-Device (LTE-D2D); Voice over LTE (VoLTE); etc. In some examples, the V2X communications can include V2V communications, Vehicle-to-Infrastructure (V2I) communications, Vehicle-to-Network (V2N) communications or any combination thereof.

Examples of a V2X wireless message described herein include, but are not limited to, the following messages: a Dedicated Short Range Communication (DSRC) message; a Basic Safety Message (BSM); a Long-Term Evolution (LTE) message; a LTE-V2X message (e.g., a LTE-Vehicle-to-Vehicle (LTE-V2V) message, a LTE-Vehicle-to-Infrastructure (LTE-V2I) message, an LTE-V2N message, etc.); a 5G-V2X message; and a millimeter wave message, etc.

Example Overview

Referring to FIG. 1, depicted is an operating environment 100 for a feedback system 199 and an analysis system 152 according to some embodiments. As depicted, the operating environment 100 includes the following elements: an ego vehicle 123; one or more remote vehicles 140; an endpoint 160; and a server 150. These elements are communicatively coupled to one another by a network 105.

Although one ego vehicle 123, three remote vehicles 140, one server 150, one endpoint 160 and one network 105 are depicted in FIG. 1, in practice the operating environment 100 may include any number of ego vehicles 123, remote vehicles 140, servers 150, endpoints 160 and networks 105.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, mmWave, WiFi (infrastructure mode), WiFi (ad-hoc mode), visible light communication, TV white space communication and satellite communication. The network 105 may also include a mobile data network that may include 3G, 4G, LTE, LTE-V2V, LTE-V2X, LTE-D2D, VoLTE, 5G-V2X or any other mobile data network or combination of mobile data networks. Further, the network 105 may include one or more IEEE 802.11 wireless networks.

The ego vehicle 123 and the remote vehicle 140 may include the same or similar elements. The ego vehicle 123 and the remote vehicle 140 may share a connection or association. For example, the ego vehicle 123 and the remote vehicle 140 may share a common manufacturer (e.g., Toyota) and the functionality described herein may only be provided to vehicles sharing this common manufacturer. For example, the ego vehicle 123 and the remote vehicle 140 may each include a communication unit.

The ego vehicle 123 and the remote vehicle 140 may be any type of vehicles. The ego vehicle 123 and the remote vehicle 140 may be the same type of vehicles relative to one another or different types of vehicles relative to one another. For example, either the ego vehicle 123 or the remote vehicle 140 may include one of the following types of vehicles: a car; a truck; a sports utility vehicle; a bus; a semi-truck; a drone; or any other roadway-based conveyance.

In some embodiments, one or more of the ego vehicle 123 and the remote vehicle 140 may include an autonomous vehicle or a semi-autonomous vehicle. For example, one or more of the ego vehicle 123 and the remote vehicle 140 may include an ADAS system 180 or an autonomous driving system 181. The ADAS system 180 or the autonomous driving system 181 may provide some or all of the functionality that provides autonomous functionality.

In some embodiments, the ego vehicle 123 includes one or more of the following elements: a processor (not shown in FIG. 1); a memory 127A; the ADAS system 180; the autonomous driving system 181; a communication unit 186A; a sensor set 184; an ECU 183; and a feedback system 199. In some embodiments, the feedback system 199 is installed in the ECU 183. These elements of the ego vehicle 123 may be communicatively coupled to one another via a bus.

In some embodiments, the processor and the memory 127A may be elements of an on-board vehicle computer system (such as computer system 200 described below with reference to FIG. 2). The on-board vehicle computer system may be operable to cause or control the operation of the feedback system 199 of the ego vehicle 123. The on-board vehicle computer system may be operable to access and execute the data stored on the memory 127A to provide the functionality described herein for the feedback system 199 of the ego vehicle 123 or its elements (see, e.g., FIG. 2). The on-board vehicle computer system may be operable to execute the feedback system 199 which causes the on-board vehicle computer system to execute one or more steps of methods 300, 400 and 500 described below with reference to FIGS. 3A and 4A-5C and a flow process 600 described below with reference to FIG. 6A-6B.

In some embodiments, the processor and the memory 127A may be elements of an on-board unit. The on-board unit includes the ECU 183 or an on-board vehicle computer system that may be operable to cause or control the operation of the feedback system 199. The on-board unit may be operable to access and execute the data stored on the memory 127A to provide the functionality described herein for the feedback system 199 or its elements. The on-board unit may be operable to execute the feedback system 199 which causes the on-board unit to execute one or more steps of the methods 300, 400 and 500 described below with reference to FIGS. 3A and 4A-5C and the flow process 600 described below with reference to FIG. 6A-6B. In some embodiments, the computer system 200 depicted in FIG. 2 is an example of an on-board unit.

The memory 127A is a non-transitory memory that stores instructions or data that may be accessed and executed by the processor of the ego vehicle 123. The instructions or data may include code for performing the techniques described herein. The memory 127A may be a dynamic random-access memory (DRAM) device, a static random-access memory (SRAM) device, flash memory, or some other memory device. In some embodiments, the memory 127A also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. A portion of the memory 127A may be reserved for use as a buffer or virtual random-access memory (virtual RAM). The ego vehicle 123 may include one or more memories 127A.

In some embodiments, the memory 127A stores, as digital data, any data described herein. In some embodiments, the memory 127A stores any data that is necessary for the feedback system 199 to provide its functionality.

For example, the memory 127A stores various data including, but not limited to, V2X data 191, sensor data 192, report data 193 and modification data 157.

The V2X data 191 includes digital data describing one or more V2X wireless messages. For example, the V2X data 191 includes digital data describing a V2X wireless message that is received from the remote vehicle 140 and indicates an occurrence of a pre-crash event associated with the remote vehicle 140. Examples of a pre-crash event include, but are not limited to: (1) one or more pre-crash behaviors (e.g., a driver of the remote vehicle 140 starting to brake hardly; the driver of the remote vehicle 140 maneuvering the wheels (to avoid a collision), etc.); and (2) one or more pre-crash conditions (e.g., a narrow road, a curvy road, a sharp turn, a blind spot on the road, an icy road, poor visibility, etc.). In this case, the pre-crash event is observed by the remote vehicle 140 and sent to the ego vehicle 123 via a V2X wireless message.

In another example, the V2X data 191 includes digital data describing one or more V2X wireless messages that are received from one or more parties (e.g., the remote vehicle 140, the endpoint 160, etc.) involved in a collision within a pre-crash time window. In some embodiments, the pre-crash time window is a time period after identifying the presence of the pre-crash event and before detecting the occurrence of the collision. For example, the pre-crash time window is a time period after the ego vehicle 123 identifies the presence of the pre-crash event associated with the remote vehicle 140 and before a time when the collision occurs to the remote vehicle 140.

The sensor data 192 includes digital data recorded by sensors in the sensor set 184. For example, the sensor data 192 includes image data captured by a camera 185. For example, the sensor data 192 includes digital data recorded by sensors of the ego vehicle 123 within the pre-crash time window.

In some embodiments, the sensor data 192 (e.g., the image data) recorded by the ego vehicle 123 can be analyzed to identify one or more other parties (e.g., the endpoint 160) that are also involved in the pre-crash event, the collision or both the pre-crash event and the collision.

In some embodiments, the sensor data 192 is processed by the feedback system 199 to generate event data describing one or more driving events that occur surrounding the ego vehicle 123. For example, different from the pre-crash event being observed by the remote vehicle 140, the driving events are observed by the ego vehicle 123 within the pre-crash time window. For example, assume that a collision involves one or more parties. Examples of driving events observed by the ego vehicle 123 include, but are not limited to, the following: (1) one or more behaviors (e.g., pre-crash behaviors) of each of the one or more parties involved in the collision that are observed by the ego vehicle 123; and (2) one or more pre-crash conditions observed by the ego vehicle 123 (e.g., a narrow road, a curvy road, a sharp turn, a blind spot on the road, an icy road, poor visibility, etc.).

For example, assume that a collision involves the remote vehicle 140 and the endpoint 160, and the event data includes one or more of the following: (1) remote-vehicle behavior data describing one or more behaviors (e.g., pre-crash behaviors) of the remote vehicle 140 that are observed by the ego vehicle 123; (2) endpoint behavior data describing one or more behaviors (e.g., pre-crash behaviors) of the endpoint 160 that are observed by the ego vehicle 123; and (3) one or more pre-crash conditions (e.g., a narrow road, a curvy road, a sharp turn, a blind spot on the road, icy road, poor visibility, etc.) that are observed by the ego vehicle 123.

It should be noted that, in some embodiments, not all of the behaviors and the pre-crash conditions included in the event data contribute to the occurrence of the collision. As described below, the event data may be analyzed through a VAR analysis to extract a collection of pre-crash behaviors and a collection of pre-crash conditions that contribute to the occurrence of the collision, and the collection of pre-crash behaviors and the collection of pre-crash conditions may be referred to as examples of collision-causing events described below.

The report data 193 can be digital data associated with a collision and is reported to the server 150. For example, the report data 193 includes one or more of: (1) first V2X data describing a V2X wireless message that is received from the remote vehicle 140 and that indicates an occurrence of a pre-crash event associated with the remote vehicle 140; (2) second V2X data describing one or more V2X wireless messages that are received from the remote vehicle 140 as well as one or more other parties (e.g., the endpoint 160) involved in the collision within the pre-crash time window; and (3) the sensor data recorded by sensors of the ego vehicle 123 within the pre-crash time window.

In another example, rather than including the sensor data, the report data 193 includes one or more of: (1) the first V2X data; (2) the second V2X data; and (3) the event data described above.

The modification data 157 is described below in more detail with reference to the server 150.

The communication unit 186A transmits and receives data to and from the network 105 or to another communication channel. In some embodiments, the communication unit 186A may include a DSRC transceiver, a DSRC receiver, a DSRC transmitter and other hardware or software necessary to make the ego vehicle 123 a DSRC-equipped device.

In some embodiments, the communication unit 186A includes a set of communication radios, e.g., V2X radios 187. The communication unit 186A includes any type of V2X communication antennas for supporting one or more of the following V2X communication protocols: DSRC; mmWave; LTE-V2X; LTE-D2D; 5G-V2X; ITS-G5; ITS-Connect; LPWAN; visible light communication; television white space; etc.

In some embodiments, the communication unit 186A includes a port for direct physical connection to the network 105 or to another communication channel. For example, the communication unit 186A includes a USB, SD, CAT-5, or similar port for wired communication with the network 105. In some embodiments, the communication unit 186A includes a wireless transceiver for exchanging data with the network 105 or other communication channels using one or more wireless communication methods, including: IEEE 802.11; IEEE 802.16, BLUETOOTH®; EN ISO 14906:2004 Electronic Fee Collection—Application interface EN 11253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471,387 filed on Aug. 28, 2014 and entitled "Full-Duplex Coordination System"; or another suitable wireless communication method.

In some embodiments, the communication unit 186A includes a full-duplex coordination system as described in U.S. patent application Ser. No. 14/471,387 filed on Aug. 28, 2014 and entitled "Full-Duplex Coordination System," the entirety of which is incorporated herein by reference.

In some embodiments, the communication unit 186A includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 186A includes a wired port and a wireless transceiver. The communication unit 186A also provides other conventional connections to the network 105 for distribution of files or media objects using standard network protocols including TCP/IP, HTTP, HTTPS, and SMTP, millimeter wave, DSRC, etc.

In some embodiments, the ADAS system 180 is a conventional ADAS system that controls operation of the ego vehicle 123. In some embodiments, the ADAS system 180 may also include any software or hardware included in the ego vehicle 123 that makes the ego vehicle 123 an autonomous vehicle or a semi-autonomous vehicle.

Examples of the ADAS system 180 may include one or more of the following elements of the ego vehicle 123: an adaptive cruise control ("ACC") system; an adaptive high beam system; an adaptive light control system; an automatic parking system; an automotive night vision system; a blind spot monitor; a collision avoidance system; a crosswind stabilization system; a driver drowsiness detection system; a driver monitoring system; an emergency driver assistance system; a forward collision warning system; an intersection assistance system; an intelligent speed adaption system; a lane departure warning system; a pedestrian protection system; a traffic sign recognition system; a turning assistant; and a wrong-way driving warning system.

In some embodiments, the autonomous driving system 181 may include any software or hardware included in the ego vehicle 123 that makes the ego vehicle 123 an autonomous vehicle. In some embodiments, the ego vehicle 123 includes either the autonomous driving system 181 or the ADAS system 180. In some other embodiments, the ego vehicle 123 includes both the autonomous driving system 181 and the ADAS system 180.

In some embodiments, the sensor set 184 may include one or more sensors that are operable to measure the physical environment outside of the ego vehicle 123. For example, the sensor set 184 may include one or more sensors that record one or more physical characteristics of the physical environment that is proximate to the ego vehicle 123. The memory 127A may store sensor data that describes the one or more physical characteristics recorded by the sensor set 184.

In some embodiments, the sensor set 184 of the ego vehicle 123 may include one or more of the following vehicle sensors: a camera 185; a LIDAR sensor; a radar sensor; a laser altimeter; an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor.

In some embodiments, the ECU 183 is an embedded system in automotive electronics that controls one or more of electrical systems or subsystems in the ego vehicle 123. Types of the ECU 183 include, but are not limited to, the following: Engine Control Module (ECM); Powertrain Control Module (PCM); Transmission Control Module (TCM); Brake Control Module (BCM or EBCM); Central Control Module (CCM); Central Timing Module (CTM); General Electronic Module (GEM); Body Control Module (BCM); and Suspension Control Module (SCM), etc.

In some embodiments, the feedback system 199 includes software that is operable, when executed by the processor of the ego vehicle 123, to cause the processor to execute one or more steps of the methods 300, 400 and 500 described below with reference to FIGS. 3A and 4A-5C and the flow process 600 described below with reference to FIGS. 6A-6B. The functionality of the feedback system 199 is described in more detail below according to some embodiments.

In some embodiments, the feedback system 199 is implemented using hardware including a field-programmable gate array ("FPGA") or an application-specific integrated circuit ("ASIC"). In some other embodiments, the feedback system 199 is implemented using a combination of hardware and software.

In some embodiments, the remote vehicle 140 may have elements similar to those of the ego vehicle 123. Similar description is not repeated here.

In some embodiments, the endpoint 160 can be any type of endpoints of the network 105. For example, the endpoint 160 can be a roadside unit, a vehicle similar to the ego vehicle 123 or the remote vehicle 140, or any other type of endpoint with or without V2X communication capability.

In some embodiments, the server 150 is a computing device that includes one or more processors and one or more memories. As depicted in FIG. 1, the server 150 includes an analysis system 152, a memory 127B and a communication unit 186B.

The communication unit 186B may have a structure similar to that of the communication unit 186A and provide functionality similar to that of the communication unit 186A. Similar description for the communication unit 186B is not repeated here. Hereinafter, the communication unit 186A and the communication unit 186B can be referred to as "communication unit 186" individually or collectively.

The memory 127B may have a structure similar to that of the memory 127A and provide functionality similar to that of the memory 127A. Similar description for the memory 127B is not repeated here. Hereinafter, the memory 127A and the memory 127B can be referred to as "memory 127" individually or collectively.

The memory 127 of the server 150 stores one or more of the following elements: the report data 193; VAR data 154; and the modification data 157.

The report data 193 is described above and similar description is not repeated here.

The VAR data 154 includes digital data describing one or more collision-causing events that contribute to an occurrence of a collision associated with the remote vehicle 140. For example, the one or more collision-causing events cause the collision. Examples of a collision-causing event include, but are not limited to, the following: one or more pre-crash behaviors of one or more parties involved in the collision (e.g., one or more pre-crash behaviors of the remote vehicle 140, one or more pre-crash behaviors of the endpoint 160 involved in the collision or a combination thereof) that contribute to an occurrence of the collision; and (2) one or more pre-crash conditions that contribute to the occurrence of the collision.

In some embodiments, the modification data 157 includes digital data describing a modification for a vehicle control system of at least one of one or more parties involved in a collision, where implementation of the modification in the vehicle control system would have resulted in the collision being avoided or made the collision less likely to occur.

In some embodiments, the modification data 157 may cause an operation of a vehicle control system in an autonomous driving system to be modified. For example, the modification data 157 may be used to modify a safety process of the autonomous vehicle which is provided by the autonomous driving system 181 to increases safety of the autonomous vehicle.

In some embodiments, the modification data 157 may cause an operation of a vehicle control system in an ADAS system 180 to be modified. For example, the modification data 157 may be used to modify one or more operations of a braking system, a steering system, an acceleration system, or a combination thereof of a vehicle, where the one or more operations are controlled by the ADAS system 180.

In some embodiments, the modification data 157 includes patch data 194 and design data 156.

The patch data 194 may include digital data describing one or more patches for software installed in a vehicle, where installation of the one or more patches in the vehicle can improve safety of the vehicle. For example, the patch data 194 includes data describing updates or patches for the software of the ADAS system 180 or the autonomous driving system 181 of a vehicle, so as to ensure that: (1) the ADAS system 180, as well as the autonomous driving system 181, operates in conformance with its design specifications (which is needed to ensure safe operation of the autonomous vehicles); (2) the ADAS system 180, as well as the autonomous driving system 181, continues to improve over time; and (3) the ADAS system 180, as well as the autonomous driving system 181, operates properly and promptly when a pre-crash event occurs to the vehicle so that a collision can be avoided or made to be less likely to occur.

The design data 156 may include digital data for improving a design of future vehicles so that safety of the future vehicles can be improved. For example, the design data 156 can be used to design new and improved versions of the ADAS system 180 as well as the autonomous driving system 181, which is needed to design future generations of autonomous vehicles.

The analysis system 152 includes software that is operable, when executed by a processor of the server 150, to cause the processor to execute one or more steps of a method 350 described below with reference to FIG. 3B and the flow process 600 described below with reference to FIGS. 6A-6B.

In some embodiments, the analysis system 152 receives report data from the ego vehicle 123 for a particular collision and performs a VAR analysis on the report data to generate VAR data describing a set of collision-causing events that contributes to an occurrence of the particular collision.

In some implementations, the report data received from the ego vehicle 123 includes one or more of: (1) V2X data describing one or more V2X wireless messages generated by a set of parties involved in the particular collision; and (2) event data describing one or more driving events observed by the ego vehicle 123. The analysis system 152 conducts a VAR analysis on the V2X data and the event data to generate VAR data describing a set of collision-causing events that causes the collision.

For example, the analysis system 152 conducts a VAR analysis on the V2X data and the event data to extract: (1) a first set of pre-crash behaviors from the V2X data; (2) a first set of pre-crash conditions from the V2X data; (3) a second set of pre-crash behaviors from the event data; and (4) a second set of pre-crash conditions from the event data. Then, the analysis system 152 identifies: (1) a collection of pre-crash behaviors that contributes to the occurrence of the collision from the first set of pre-crash behaviors and the second set of pre-crash behaviors; and (2) a collection of pre-crash conditions that contributes to the occurrence of the collision from the first set of pre-crash conditions and the second set of pre-crash conditions. The analysis system 152 generates a set of collision-causing events that includes one or more of: (1) the collection of pre-crash behaviors; and (2) the collection of pre-crash conditions.

In a further example, assume that the collision involves the remote vehicle 140 and the endpoint 160, and the report data includes one or more of: (1) first V2X data describing one or more first V2X wireless messages generated by the remote vehicle 140; (2) second V2X data describing one or more second V2X wireless message generated by the endpoint 160 (if the endpoint 160 is also a connected device with V2X communication capability); and (3) event data including (i) remote-vehicle behavior data describing one or more behaviors of the remote vehicle 140 that are observed by the ego vehicle 123, (ii) endpoint behavior data describing one or more behaviors of the endpoint 160 that are observed by the ego vehicle 123, and (iii) one or more pre-crash conditions (e.g., a narrow road, a curvy road, a sharp turn, a blind spot on the road, icy road, poor visibility, etc.) that are observed by the ego vehicle 123. Next, the analysis system 152 conducts a VAR analysis on the first V2X data, the second V2X data and the event data to extract: (1) a first set of pre-crash behaviors of the remote vehicle 140 from the first V2X data; (2) a first set of pre-crash conditions from the first V2X data; (3) a second set of pre-crash behaviors of the endpoint 160 from the second V2X data; (4) a second set of pre-crash conditions from the second V2X data; (5) a third set of pre-crash behaviors of the remote vehicle 140 from the remote-vehicle behavior data; (6) a fourth set of pre-crash behaviors of the endpoint 160 from the endpoint behavior data; and (7) a third set of pre-crash conditions from the event data. Then, the analysis system 152 identifies: (1) a collection of pre-crash behaviors of the remote vehicle 140 that contributes to the occurrence of the collision from the first set of pre-crash behaviors of the remote vehicle 140 and the third set of pre-crash behaviors of the remote vehicle 140; (2) a collection of pre-crash behaviors of the endpoint 160 that contributes to the occurrence of the collision from the second set of pre-crash behaviors of the endpoint 160 and the fourth set of pre-crash behaviors of the endpoint 160; and (3) a collection of pre-crash conditions that contributes to the occurrence of the collision from the first set of pre-crash conditions, the second set of pre-crash conditions and the third set of pre-crash conditions. The analysis system 152 generates a set of collision-causing events that includes one or more of the following: (1) the collection of pre-crash behaviors of the remote vehicle 140; (2) the collection of pre-crash behaviors of the endpoint 160; and (3) the collection of pre-crash conditions.

In some other implementations, the report data includes: (1) V2X data describing one or more V2X wireless messages; and (2) sensor data recorded by the ego vehicle 123. In this case, the analysis system 152 can process the sensor data to determine event data describing one or more driving events and then perform similar operations to generate the VAR data.

Next, the analysis system 152 analyzes the VAR data describing the set of collision-causing events to generate modification data that describes a modification for a vehicle control system of at least one of the one or more parties involved in the collision, where implementation of the modification in the vehicle control system would have resulted in the collision being avoided or made the collision less likely to occur. For example, assume that a cause for the occurrence of the collision relates to a setting of a parameter in a braking system controlled by the ADAS system 180, and the analysis system 152 can generate modification data to modify the setting of the parameter in the braking system to improve driving safety.

In some embodiments, the analysis system 152 analyzes the VAR data to generate one or more of the patch data 194 and the design data 156.

In some embodiments, the analysis system 152 includes a machine learning module configured for analyzing the VAR data (or the report data) to generate modification data for improving performance of vehicles. In some embodiments, the machine learning module utilizes one or more machine learning techniques (e.g., a deep learning technique, a neural network, etc.) to analyze the VAR data (or the report data).

In some embodiments, the machine learning module utilizes a learning algorithm to build the VAR data into a learning database so that safety of vehicles can be improved as the learning database stores increasing instances of VAR data that are used to generate the modification data. As more and more VAR data is received, more and more items of the learning database can be built. Then, the items in the learning database can be used as training data for training the one or more machine learning techniques used to analyze the VAR data.

In some embodiments, the machine learning module utilizes a learning algorithm and the VAR data is provided as an input to the learning algorithm. As more and more VAR data is received as time elapses, the learning algorithm recursively analyzes the VAR data and modifies operations of vehicle control systems of vehicles to improve safety over time based on the VAR data.

The analysis system 152 provides the generated modification data to the ego vehicle 123 as well as any other vehicles that are suitable to implement the modification data. In some embodiments, if the patch data 194 is generated, the analysis system 152 provides the patch data 194 to the ego vehicle 123 and other vehicles that include the affected ADAS systems or autonomous driving systems.

In some embodiments, the analysis system 152 is implemented using hardware including a field-programmable gate array ("FPGA") or an application-specific integrated circuit ("ASIC"). In some other embodiments, the analysis system 152 is implemented using a combination of hardware and software.

The analysis system 152 is described further below with reference to FIG. 3B.

An example application scenario involving the feedback system 199 and the analysis system 152 is provided here. In some embodiments, a DSRC-equipped vehicle (e.g., a transmitter vehicle such as the remote vehicle 140) can transmit BSMs which include vehicle dynamic information. These BSMs, once received by a neighboring vehicle (e.g., a receiver vehicle such as the ego vehicle 123), can be used to determine whether a pre-crash event occurs to the transmitter vehicle. For example, in a pre-collision scenario involving the DSRC-equipped vehicle (e.g., the remote vehicle 140) and a disconnected vehicle (e.g., a vehicle with no V2X communication capability), if a driver of the DSRC-equipped vehicle (e.g., the remote vehicle 140) starts braking or maneuvering the wheel (to avoid a collision), the BSMs of the DSRC-equipped vehicle may reflect these behaviors. The neighboring DSRC-equipped vehicle (e.g., the ego vehicle 123) may automatically record its camera readings for a period of time (e.g., 5 seconds) and upload the camera readings to a cloud server. If the DSRC-equipped vehicle (e.g., the remote vehicle 140) and the disconnected vehicle end up colliding with one another, the camera readings from the neighboring DSRC-equipped vehicle (e.g., the ego vehicle 123) at that moment may be used to enhance VAR analysis on the collision.

The BSMs may include vehicle dynamic information. For example, whenever the driver maneuvers the DSRC-equipped vehicle (e.g., the remote vehicle 140) on the road (e.g., trying to switch lanes to catch up a missing exit, deliberately cutting lines, etc.), the resulted vehicle dynamic information is captured in the BSMs of the DSRC-equipped vehicle. Because these operations are often leading causes to accidents, the neighboring DSRC-equipped vehicle (e.g., the ego vehicle 123) may upload sensor data recorded by its sensors to the cloud server at the moment when these BSMs are heard over the air. These BSMs and the sensor data can be beneficial for a VAR analysis and legal disputes settlement, etc.

Example Computer System

Figure 2:
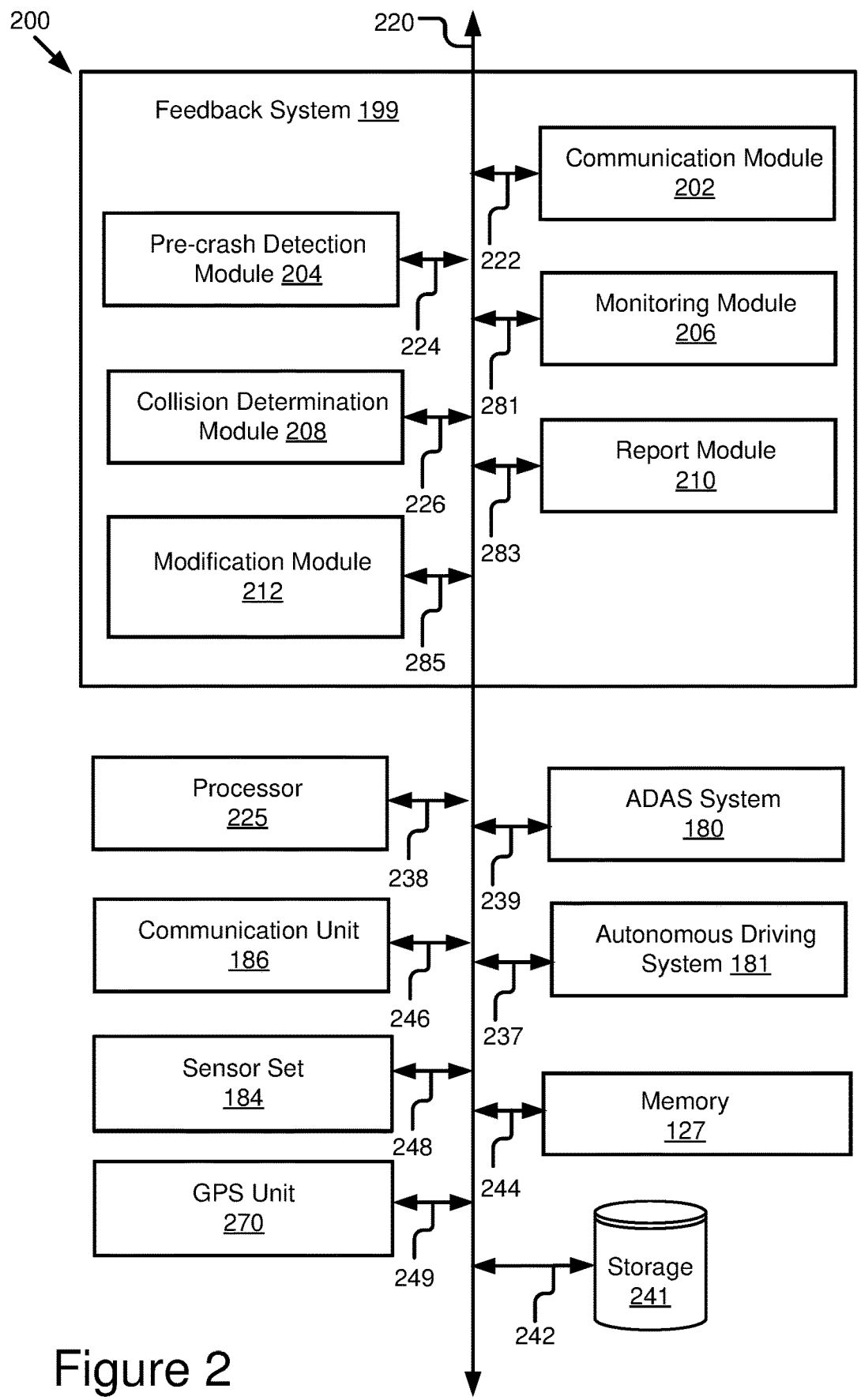
FIG. 2 is a block diagram illustrating an example computer system including a feedback system according to some embodiments.

Referring now to FIG. 2, depicted is a block diagram illustrating an example computer system 200 including the feedback system 199 according to some embodiments. In some embodiments, the computer system 200 may include a special-purpose computer system that is programmed to perform one or more steps of the methods 300, 400 and 500 and the flow process 600 described below with reference to FIGS. 3A and 4-6B. In some embodiments, the computer system 200 is an on-board vehicle computer of the ego vehicle 123. In some embodiments, the computer system 200 is an on-board unit of the ego vehicle 123. In some embodiments, the computer system 200 is an electronic control unit (ECU), head unit or some other processor-based computing device of the ego vehicle 123.

The computer system 200 includes one or more of the following elements according to some examples: the feedback system 199; a processor 225; the communication unit 186; the memory 127; the ADAS system 180; the autonomous driving system 181; the sensor set 184; a GPS unit 270; and a storage 241. The components of the computer system 200 are communicatively coupled by a bus 220.

In the illustrated embodiment, the processor 225 is communicatively coupled to the bus 220 via a signal line 238. The ADAS system 180 is communicatively coupled to the bus 220 via a signal line 239. The autonomous driving system 181 is communicatively coupled to the bus 220 via a signal line 237. The communication unit 186 is communicatively coupled to the bus 220 via a signal line 246. The memory 127 is communicatively coupled to the bus 220 via a signal line 244. The sensor set 184 is communicatively coupled to the bus 220 via a signal line 248. The storage 241 is communicatively coupled to the bus 220 via a signal line 242. The GPS unit 270 is communicatively coupled to the bus 220 via a signal line 249.

The processor 225 includes an arithmetic logic unit, a microprocessor, a general-purpose controller, or some other processor array to perform computations and provide electronic display signals to a display device. The processor 225 processes data signals and may include various computing architectures including a complex instruction set computer (CISC) architecture, a reduced instruction set computer (RISC) architecture, or an architecture implementing a combination of instruction sets. The computer system 200 may include one or more processors 225. Other processors, operating systems, sensors, displays, and physical configurations may be possible.

In some embodiments, the GPS unit 270 is a conventional GPS unit of the computer system 200. For example, the GPS unit 270 may include hardware that wirelessly communicates with a GPS satellite to retrieve data that describes a geographic location of the computer system 200. For example, the GPS unit 270 retrieves GPS data from one or more GPS satellites. In some embodiments, the GPS unit 270 is a DSRC-compliant GPS unit of the computer system 200 that is operable to provide GPS data describing the geographic location of the computer system 200 with lane-level accuracy.

The storage 241 is a non-transitory memory that stores instructions or data that may be accessed and executed by the processor 225. The instructions or data may include code for performing the techniques described herein. The storage 241 may be a dynamic random-access memory (DRAM) device, a static random-access memory (SRAM) device, flash memory, or some other memory device. In some embodiments, the storage 241 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some embodiments, the storage 241 may store any of the data described above with reference to FIG. 1 or below with reference to FIGS. 2-7B. The storage 241 may store any data needed for the computer system 200 to provide its functionality.

In the illustrated embodiment shown in FIG. 2, the feedback system 199 includes: a communication module 202; a pre-crash detection module 204; a monitoring module 206; a collision determination module 208; a report module 210; and a modification module 212.

The communication module 202 can be software including routines for handling communications between the feedback system 199 and other components of the operating environment 100 of FIG. 1.

In some embodiments, the communication module 202 can be a set of instructions executable by the processor 225 to provide the functionality described below for handling communications between the feedback system 199 and other components of the computer system 200. In some embodiments, the communication module 202 can be stored in the memory 127 of the computer system 200 and can be accessible and executable by the processor 225. The communication module 202 may be adapted for cooperation and communication with the processor 225 and other components of the computer system 200 via a signal line 222.

The communication module 202 sends and receives data, via the communication unit 186, to and from one or more elements of the operating environment 100. For example, the communication module 202 receives or transmits, via the communication unit 186, some or all of the digital data stored on the memory 127. The communication module 202 may send or receive any of the digital data or messages described above with reference to FIG. 1, or below with reference to FIGS. 2-7B, via the communication unit 186.

In some embodiments, the communication module 202 receives data from components of the feedback system 199 and stores the data in the memory 127 (or a buffer or cache of the memory 127, or a standalone buffer or cache which is not depicted in FIG. 2). For example, the communication module 202 receives modification data from the communication unit 186 and stores the modification data in the memory 127.

In some embodiments, the communication module 202 may handle communications between components of the feedback system 199. For example, the communication module 202 transmits event data from the monitoring module 206 to one or more of the collision determination module 208 and the report module 210.

In some embodiments, the pre-crash detection module 204 can be a set of instructions executable by the processor 225 which are operable, when executed by the processor 225, to cause the processor 225 to detect an occurrence of a pre-crash event associated with the remote vehicle 140. In some embodiments, the pre-crash detection module 204 can be stored in the memory 127 of the computer system 200 and can be accessible and executable by the processor 225. The pre-crash detection module 204 may be adapted for cooperation and communication with the processor 225 and other components of the computer system 200 via a signal line 224.

In some embodiments, the pre-crash detection module 204 is operable to receive an initial set of V2X wireless messages from a set of nearby remote vehicles 140 via the network 105, where the initial set of V2X wireless messages includes a first V2X wireless message from the remote vehicle 140 included in the set of nearby remote vehicles 140. The pre-crash detection module 204 analyzes the initial set of V2X wireless messages to identify that the first V2X wireless message includes data indicating a pre-crash event associated with the remote vehicle 140.

Examples of a pre-crash event include, but are not limited to: (1) a pre-crash behavior (e.g., a driver of the remote vehicle 140 starting to brake hardly; the driver of the remote vehicle 140 maneuvering the wheels (to avoid a collision), etc.); and (2) a pre-crash condition (e.g., a narrow road, a curvy road, a sharp turn, a blind spot on the road, an icy road, poor visibility, etc.). In this case, the pre-crash event is observed by the remote vehicle 140 and sent to the ego vehicle 123 via the first V2X wireless message (e.g., a BSM).

For example, the pre-crash detection module 204 analyzes path history data and vehicle kinematic data included in the first V2X wireless message to determine whether this data included in the first V2X wireless message indicates a pre-crash behavior by the particular remote vehicle 140 that transmits the first V2X wireless message (e.g., for example, if a driver of the remote vehicle 140 starts braking or maneuvering the wheels (to avoid a collision), its BSM data included in a BSM message may reflect these behaviors). Responsive to identifying that the first V2X wireless message includes data indicating the pre-crash behavior associated with the remote vehicle 140, the pre-crash detection module 204 identifies a presence of a pre-crash event.

In some embodiments, the presence of the pre-crash event may cause the monitoring module 206 described below to start monitoring the remote vehicle 140 involved in the pre-crash event. In some embodiments, the pre-crash event may also involve another party such as the endpoint 160, and the presence of the pre-crash event may also cause the monitoring module 206 to start monitoring the endpoint 160.

In some embodiments, the monitoring module 206 can be a set of instructions executable by the processor 225 which are operable, when executed by the processor 225, to cause the processor 225 to monitor the remote vehicle 140 involved in the pre-crash event as well as any other party involved in the pre-crash event. In some embodiments, the monitoring module 206 can be stored in the memory 127 of the computer system 200 and can be accessible and executable by the processor 225. The monitoring module 206 may be adapted for cooperation and communication with the processor 225 and other components of the computer system 200 via a signal line 281.

In some embodiments, responsive to the presence of the pre-crash event, the monitoring module 206 is operable to cause one or more sensors of the ego vehicle 123 to record sensor data and is also operable to generate event data describing one or more driving events based on the sensor data. In some examples, the monitoring module 206 generates, based on the sensor data, remote-vehicle behavior data describing one or more behaviors of the remote vehicle 140 that are observed by the ego vehicle 123, so that the event data includes the remote-vehicle behavior data. The one or more behaviors of the remote vehicle include, for example, one or more pre-crash behaviors of the remote vehicle 140 that are observed by the ego vehicle 123.

For example, responsive to the presence of the pre-crash event, the monitoring module 206 causes one or more onboard cameras of the ego vehicle 123 to start recording images of behaviors (e.g., pre-crash behaviors) of the remote vehicle 140. In this case, the sensor data includes image data describing one or more images that depict one or more behaviors of the remote vehicle 140 observed by the ego vehicle 123, and the monitoring module 206 uses one or more imaging processing techniques to extract remote-vehicle behavior data describing the one or more behaviors of the remote vehicle 140 from the image data.

In some embodiments, responsive to the presence of the pre-crash event, the monitoring module 206 is also operable to monitor the remote vehicle 140 to continue receiving one or more second V2X wireless messages from the remote vehicle 140. For example, as the monitoring module 206 monitors the remote vehicle 140 to capture the sensor data (or, the event data), the remote vehicle 140 continues to transmit new BSMs to the ego vehicle 123 at an interval such as once every 0.10 seconds. In this case, the monitoring module 206 continues to receive and store new BSMs from the remote vehicle 140.

In some embodiments, the monitoring module 206 analyzes the sensor data to determine that the pre-crash event involves the remote vehicle 140 and the endpoint 160. The monitoring module 206 also monitors the endpoint 160 to receive one or more third V2X wireless messages from the endpoint 160 (if the endpoint 160 is a connected device that is capable of transmitting V2X wireless messages).

In some examples, the monitoring module 206 generates, based on the sensor data, endpoint behavior data describing one or more behaviors of the endpoint 160 that are observed by the ego vehicle 123, so that the event data further includes the endpoint behavior data. The one or more behaviors of the endpoint 160 include, for example, one or more pre-crash behaviors of the endpoint 160 that are observed by the ego vehicle 123.

For example, the sensor data includes image data describing one or more images that depict one or more behaviors of the endpoint 160 observed by the ego vehicle 123, and the monitoring module 206 uses one or more imaging processing techniques to extract endpoint behavior data describing the one or more behaviors of the endpoint 160 from the image data.

It should be noted that, in some embodiments, a first subset of images captured by the ego vehicle 123 may capture behaviors of both the remote vehicle 140 and the endpoint 160, a second subset of images captured by the ego vehicle 123 may capture only behaviors of the remote vehicle 140, and a third subset of images captured by the ego vehicle 123 may capture only behaviors of the endpoint 160. In this case, the first subset of images can be processed to extract behaviors of the remote vehicle 140 and behaviors of the endpoint 160, the second subset of images can be processed to extract behaviors of the remote vehicle 140, and the third subset of images can be processed to extract behaviors of the endpoint 160.

It should be noted that, if the endpoint 160 is also a connected device such as a connected vehicle or a connected roadside unit, at least one benefit to identify the endpoint 160 involved in the pre-crash event by the ego vehicle 123 before the collision occurs is that the monitoring module 206 can also start to monitor BSMs from the endpoint 160 before the collision is detected. Then, the report data sent to the server 150 that is described below with reference to the report module 210 can include pre-crash BSM data and pre-crash behaviors of both parties (e.g., the remote vehicle 140 and the endpoint 160) involved in the collision, which can make the analysis of the collision more accurate and more efficient. On the other hand, even if the endpoint 160 is not a connected device (in this case the endpoint 160 cannot generate BSM data), the report data can include pre-crash behaviors of both parties involved in the crash (which are observed by the ego vehicle 123), which can also make the analysis of the collision more accurate and more efficient compared with a scenario that the report data only includes pre-crash behaviors of the remote vehicle 140.

In some embodiments, the monitoring module 206 analyzes the sensor data to generate condition data describing one or more pre-crash conditions that are observed by the ego vehicle 123, so that the event data further includes the condition data.

The monitoring module 206 aggregates the first V2X wireless message and the one or more second wireless messages received from the remote vehicle 140, as well as the one or more third V2X wireless messages received from the endpoint 160 (if there is any), into a first set of V2X wireless messages. The monitoring module 206 includes the remote-vehicle behavior data, as well as the condition data (if there is any) and the endpoint behavior data (if there is any), into the event data. The monitoring module 206 sends the first set of V2X wireless messages and the event data to the collision determination module 208.

In some embodiments, the collision determination module 208 can be a set of instructions executable by the processor 225 which are operable, when executed by the processor 225, to cause the processor 225 to determine an occurrence of a collision to the remote vehicle 140. In some embodiments, the collision determination module 208 can be stored in the memory 127 of the computer system 200 and can be accessible and executable by the processor 225. The collision determination module 208 may be adapted for cooperation and communication with the processor 225 and other components of the computer system 200 via a signal line 226.

In some embodiments, the collision determination module 208 is operable to detect that a collision occurs to the remote vehicle 140 (as well as to the endpoint 160 if it is also involved in the collision) based on one or more of the event data and the first set of V2X wireless messages. For example, the first set of V2X wireless messages includes the one or more second V2X wireless messages received from the remote vehicle 140 and the event data includes the remote-vehicle behavior data. The collision determination module 208 determines that the remote vehicle 140 is involved in the collision based on one or more of the one or more second V2X wireless messages and the remote-vehicle behavior data. In another example, the first set of V2X wireless messages further includes the one or more third V2X wireless messages received from the endpoint 160 and the event data further includes the endpoint behavior data. The collision determination module 208 determines that the endpoint 160 is involved in the collision with the remote vehicle 140 based on one or more of the one or more third V2X wireless messages and the endpoint behavior data.

In a further example, assume that the remote-vehicle behavior data and the endpoint behavior data observed by the ego vehicle 123 indicate that the remote vehicle 140 hits the endpoint 160. In this case, the collision determination module 208 determines that a collision occurs to the remote vehicle 140 and the endpoint 160.

In some embodiments, the monitoring module 206 also determines a time when the collision occurs based on one or more of the event data and the first set of V2X wireless messages. For example, if the collision is detected based on a particular V2X wireless message from the first set of V2X wireless messages, then the monitoring module 206 determines a collision-occurrence time as a time when the particular V2X wireless message is generated.

In some embodiments, the monitoring module 206 described above continues to generate the first set of V2X wireless messages and the event data by monitoring one or more of the remote vehicle 140 and the endpoint 160 and sends the first set of V2X wireless messages and the event data to the collision determination module 208 until the collision is detected to occur to the remote vehicle 140. In this case, the first set of V2X wireless messages received from the monitoring module 206 includes V2X wireless messages received from the remote vehicle 140 within a pre-crash time window, as well as V2X wireless messages from the endpoint 160 within the pre-crash time window if the endpoint 160 has V2X communication capability and is also involved in the collision. The event data received from the monitoring module 206 includes remote-vehicle behavior data of the remote vehicle 140 (as well as endpoint behavior data of the endpoint 160 if the endpoint 160 is also involved in the collision) that is captured by the ego vehicle 123 within the pre-crash time window.

In some embodiments, the pre-crash time window is a time period after identifying the presence of the pre-crash event and before detecting the occurrence of the collision. For example, the pre-crash time window is a time period after the monitoring module 206 identifies the presence of the pre-crash event associated with the remote vehicle 140 and before a time when the collision occurs to the remote vehicle 140.

The collision determination module 208 forwards the first set of V2X wireless messages and the event data within the pre-crash time window to the report module 210.

In some embodiments, the report module 210 can be a set of instructions executable by the processor 225 which are operable, when executed by the processor 225, to cause the processor 225 to generate report data. In some embodiments, the report module 210 can be stored in the memory 127 of the computer system 200 and can be accessible and executable by the processor 225. The report module 210 may be adapted for cooperation and communication with the processor 225 and other components of the computer system 200 via a signal line 283.

In some embodiments, the report module 210 generates report data associated with the collision of the remote vehicle 140, where the report data includes one or more of: (1) V2X data describing the first set of V2X wireless messages received prior to detecting the occurrence of the collision; and (2) the event data describing one or more driving events that are observed by the ego vehicle 123. For example, the report data includes the first set of V2X wireless messages received from one or more of the remote vehicle 140 and the endpoint 160 within the pre-crash time window and the event data extracted from sensor data recorded within the pre-crash time window. The report data is described above with reference to FIG. 1, and similar description is not repeated here. The report module 210 sends the report data to the analysis system 152 in the server 150 via the communication unit 186.

In some embodiments, instead of including the event data that is derived from the sensor data, the report data may directly include the sensor data recorded by sensors of the ego vehicle 123 within the pre-crash time window. In this case, the analysis system 152 in the server 150 that receives this report data can perform operations similar to those described above to extract event data from the sensor data. Similar description is not repeated here.

In some embodiments, the modification module 212 can be a set of instructions executable by the processor 225 which are operable, when executed by the processor 225, to cause the processor 225 to modify a vehicle control system of the ego vehicle 123. In some embodiments, the modification module 212 can be stored in the memory 127 of the computer system 200 and can be accessible and executable by the processor 225. The modification module 212 may be adapted for cooperation and communication with the processor 225 and other components of the computer system 200 via a signal line 285.

In some embodiments, the modification module 212 receives modification data that describes a modification for a vehicle control system of the ego vehicle 123 from the server 150, where the modification data is generated based on the report data through a VAR analysis. The modification module 212 modifies an operation of the vehicle control system based on the modification data to improve safety of the ego vehicle 123.

In some embodiments, the vehicle control system includes one of the ADAS system 180 and the autonomous driving system 181. For example, the ego vehicle 123 is an autonomous vehicle and the modification module 212 modifies the operation of the vehicle control system based on the modification data at least by: modifying a safety process of the autonomous vehicle which is provided by the autonomous driving system 181 based on the modification data to increases safety of the autonomous vehicle.

In another example, the modification module 212 modifies the operation of the vehicle control system based on the modification data at least by: modifying one or more operations of one or more of a braking system, a steering system and an acceleration system of the ego vehicle 123 based on the modification data to improve safety of the ego vehicle 123, where the one or more operations are controlled by the ADAS system 180.

Example Processes

Figure 3A:
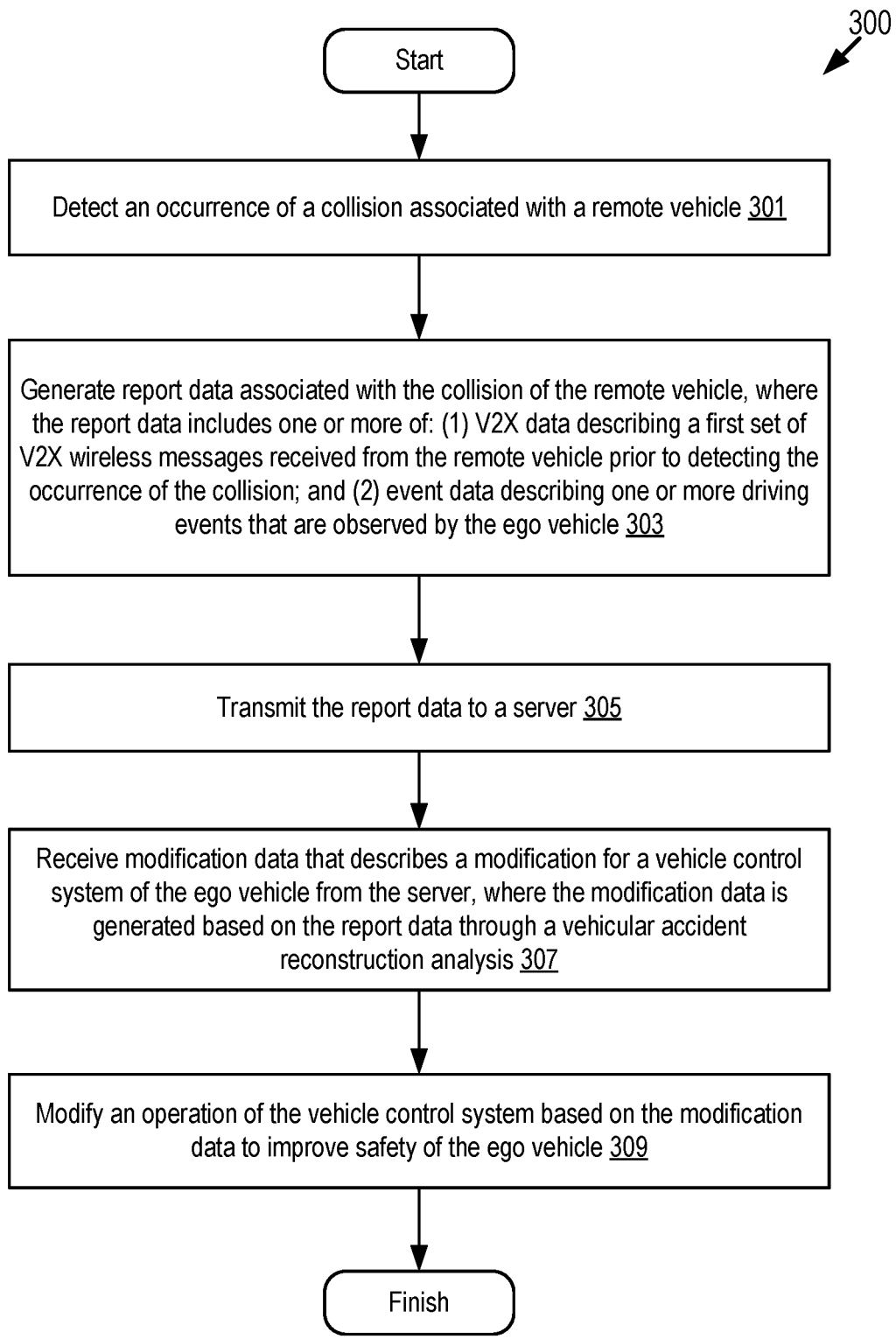
FIG. 3A depicts a method for modifying a vehicle control system of a connected vehicle based on a result of a VAR analysis according to some embodiments.

FIG. 3A depicts a method 300 for modifying a vehicle control system of a connected vehicle based on a result of a VAR analysis according to some embodiments. The steps of the method 300 are executable in any order, and not necessarily the order depicted in FIG. 3A. Here, assume that the connected vehicle is the ego vehicle 123.

At step 301, the collision determination module 208 detects an occurrence of a collision associated with the remote vehicle 140.

At step 303, the report module 210 generates report data associated with the collision of the remote vehicle 140, where the report data includes one or more of: (1) V2X data describing a first set of V2X wireless messages received prior to detecting the occurrence of the collision; and (2) event data describing one or more driving events that are observed by the ego vehicle 123.

At step 305, the report module 210 transmits the report data to the server 150.

At step 307, the modification module 212 receives modification data that describes a modification for a vehicle control system of the ego vehicle 123 from the server 150, where the modification data is generated based on the report data through a VAR analysis.

At step 309, the modification module 212 modifies an operation of the vehicle control system based on the modification data to improve safety of the ego vehicle 123.

Figure 3B:
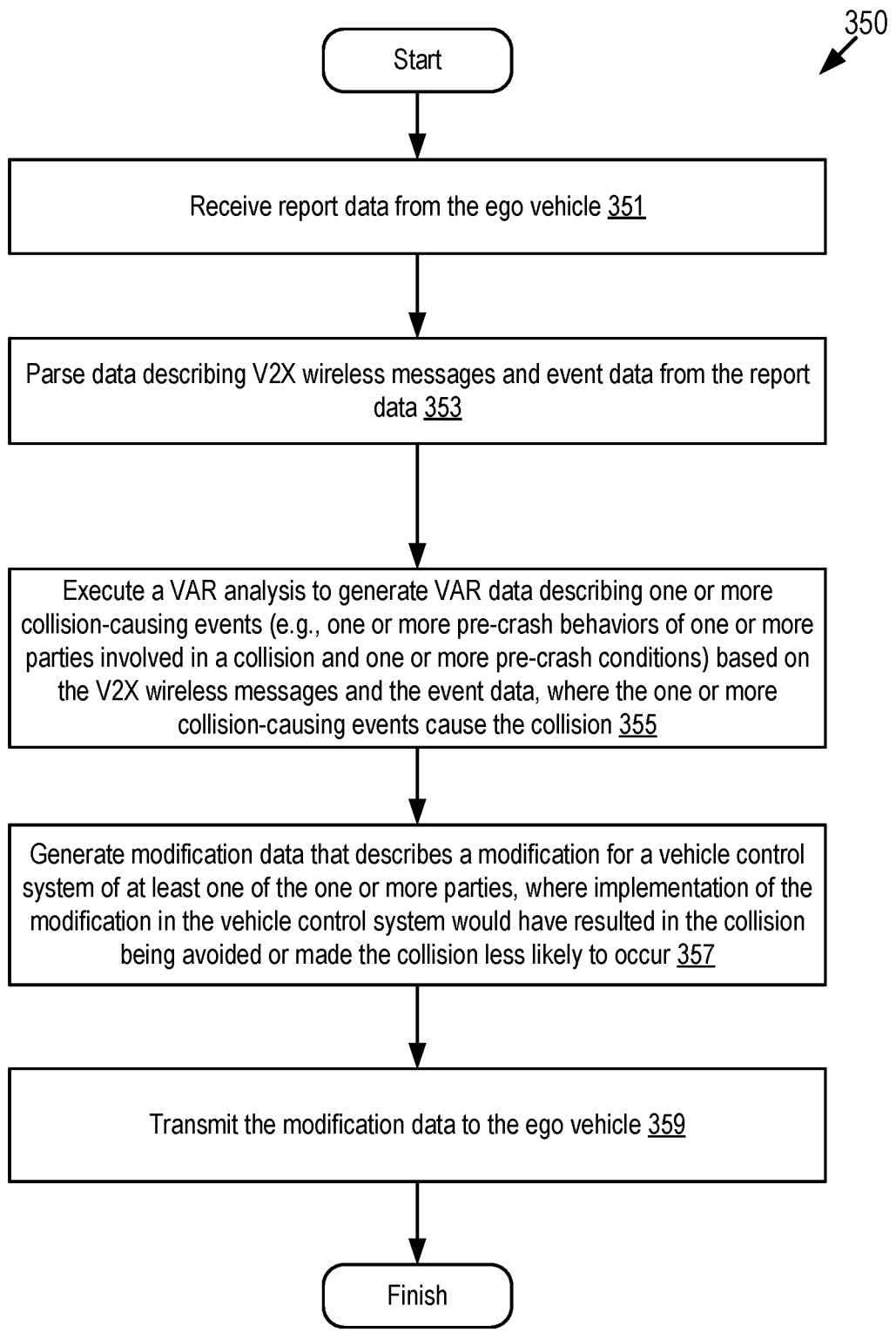
FIG. 3B depicts a method for executing a VAR analysis on report data according to some embodiments.

FIG. 3B depicts a method 350 for executing a VAR analysis on report data according to some embodiments. The steps of the method 350 are executable in any order, and not necessarily the order depicted in FIG. 3B.

At step 351, the analysis system 152 receives report data from the ego vehicle 123.

At step 353, the analysis system 152 parses (1) data describing V2X wireless messages and (2) event data from the report data.

At step 355, the analysis system 152 executes a VAR analysis to generate VAR data describing one or more collision-causing events (e.g., one or more pre-crash behaviors of one or more parties involved in a collision and one or more pre-crash conditions) based on the V2X wireless messages and the event data, where the one or more collision-causing events cause the collision.

At step 357, the analysis system 152 generates modification data that describes a modification for a vehicle control system of at least one of the one or more parties, where implementation of the modification in the vehicle control system would have resulted in the collision being avoided or made the collision less likely to occur.

At step 359, the analysis system 152 transmits the modification data to the ego vehicle 123.

Figure 4A:
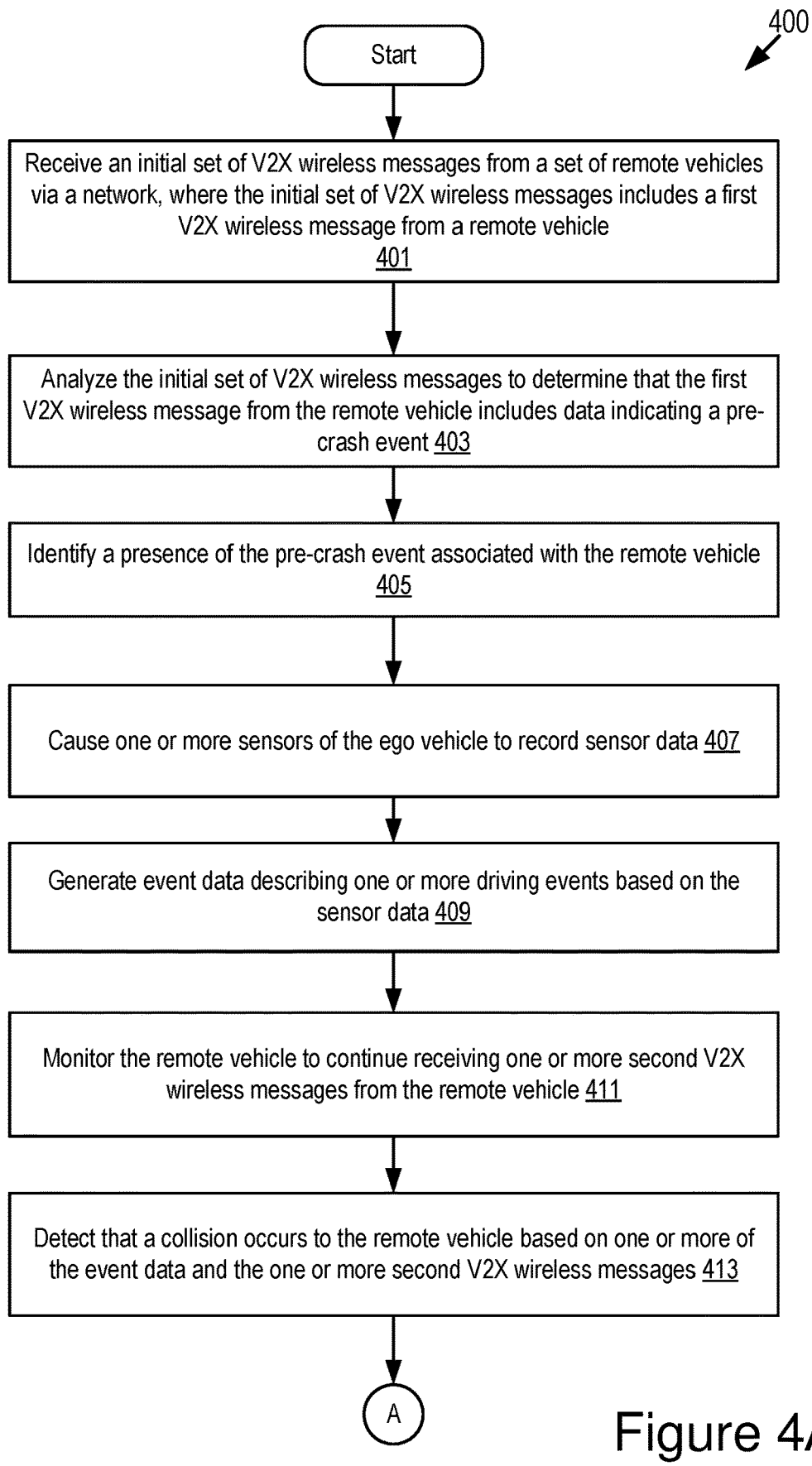
FIGS. 4A-4B depict another method for modifying a vehicle control system of a connected vehicle based on a result of a VAR analysis according to some embodiments.
Figure 4B:
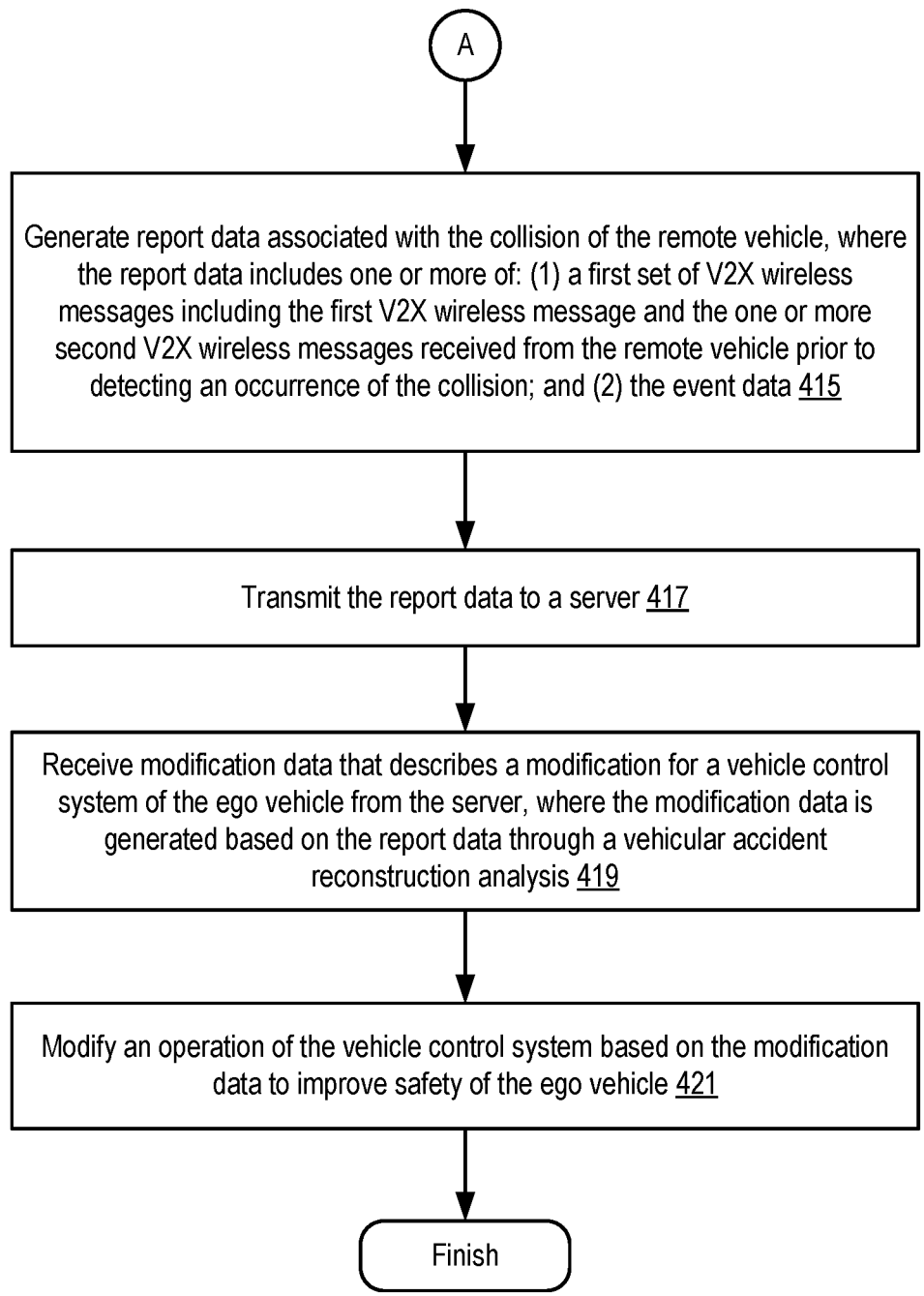

FIGS. 4A-4B depict another method 400 for modifying a vehicle control system of a connected vehicle based on a result of a VAR analysis according to some embodiments. The steps of the method 400 are executable in any order, and not necessarily the order depicted in FIGS. 4A-4B. Here, assume that the connected vehicle is the ego vehicle 123.

Referring to FIG. 4A, at step 401, the pre-crash detection module 204 receives an initial set of V2X wireless messages from a set of remote vehicles 140 via the network 105, where the initial set of V2X wireless messages includes a first V2X wireless message from the remote vehicle 140.

At step 403, the pre-crash detection module 204 analyzes the initial set of V2X wireless messages to determine that the first V2X wireless message from the remote vehicle 140 includes data indicating a pre-crash event.

At step 405, the pre-crash detection module 204 identifies a presence of the pre-crash event associated with the remote vehicle 140.

At step 407, the monitoring module 206 causes one or more sensors of the ego vehicle 123 to record sensor data.

At step 409, the monitoring module 206 generates event data describing one or more driving events based on the sensor data.

At step 411, the monitoring module 206 monitors the remote vehicle 140 to continue receiving one or more second V2X wireless messages from the remote vehicle 140.

At step 413, the collision determination module 208 detects that a collision occurs to the remote vehicle 140 based on one or more of the event data and the one or more second V2X wireless messages.

Referring to FIG. 4B, at step 415, the report module 210 generates report data associated with the collision of the remote vehicle 140, where the report data includes one or more of: (1) a first set of V2X wireless messages including the first V2X wireless message and the one or more second V2X wireless messages received from the remote vehicle 140 prior to detecting the occurrence of the collision; and (2) the event data.

At step 417, the report module 210 transmits the report data to the server 150.

At step 419, the modification module 212 receives modification data that describes a modification for a vehicle control system of the ego vehicle 123 from the server 150, where the modification data is generated based on the report data through a vehicular accident reconstruction analysis.

At step 421, the modification module 212 modifies an operation of the vehicle control system based on the modification data to improve safety of the ego vehicle 123.

Figure 5A:
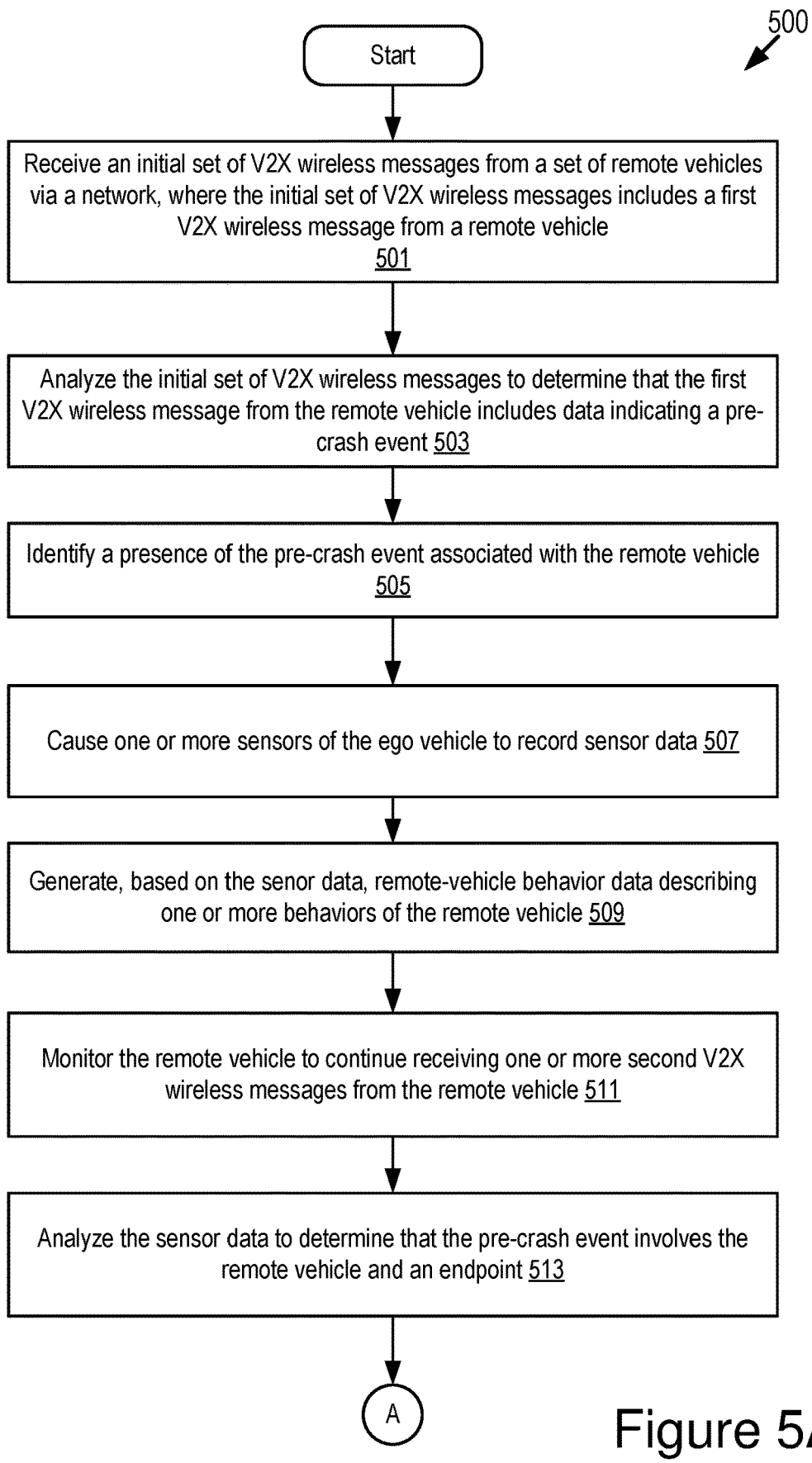
FIGS. 5A-5C depict yet another method for modifying a vehicle control system of a connected vehicle based on a result of a VAR analysis according to some embodiments.
Figure 5B:
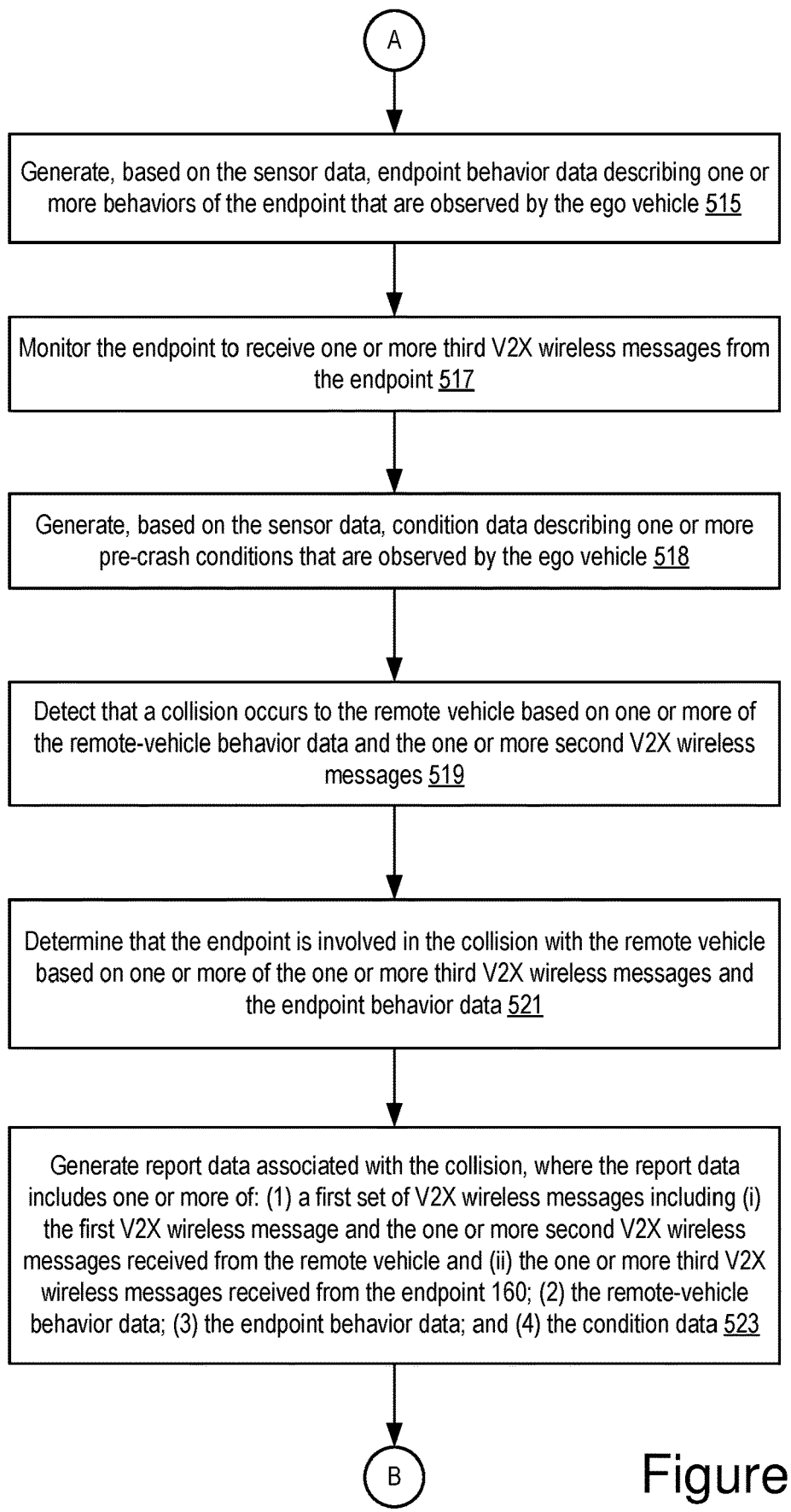
Figure 5C:
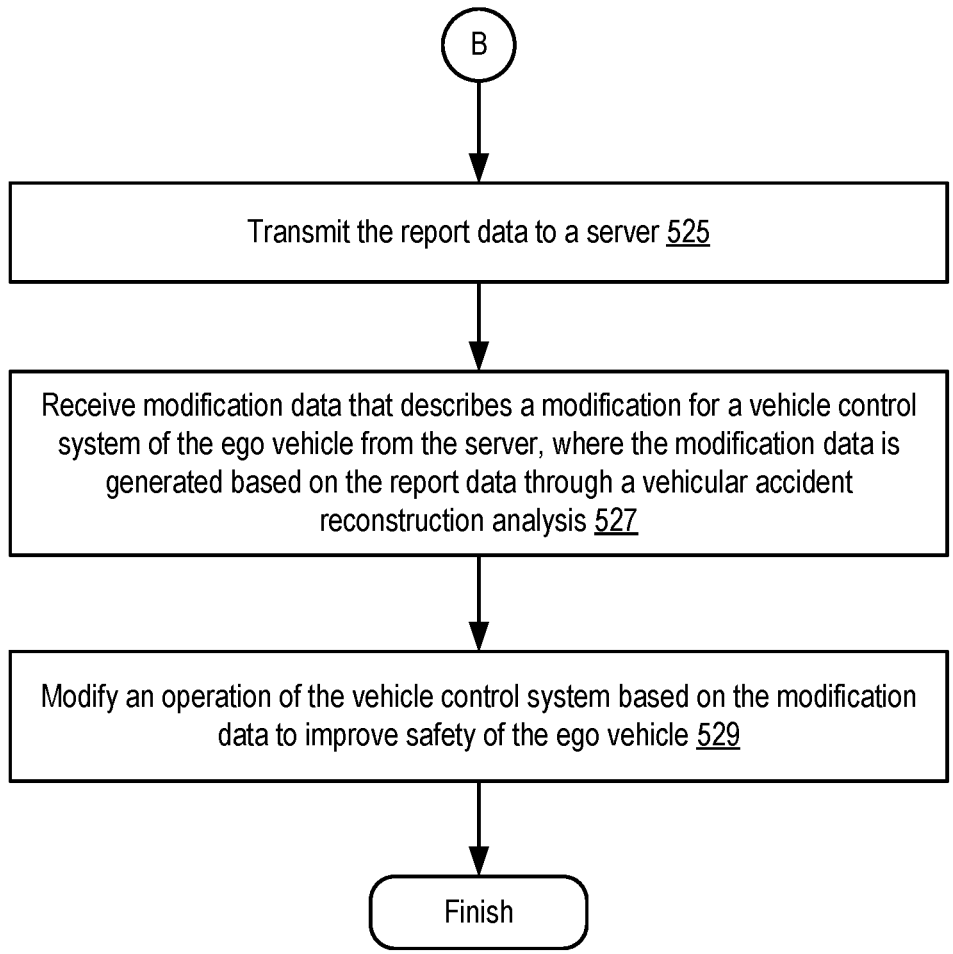

FIGS. 5A-5C depicts yet another method 500 for modifying a vehicle control system of a connected vehicle based on a result of a VAR analysis according to some embodiments. The steps of the method 500 are executable in any order, and not necessarily the order depicted in FIGS. 5A-5C. Here, assume that the connected vehicle is the ego vehicle 123.

Referring to FIG. 5A, at step 501, the pre-crash detection module 204 receives an initial set of V2X wireless messages from a set of remote vehicles via the network 105, where the initial set of V2X wireless messages includes a first V2X wireless message from the remote vehicle 140.

At step 503, the pre-crash detection module 204 analyzes the initial set of V2X wireless messages to determine that the first V2X wireless message from the remote vehicle 140 includes data indicating a pre-crash event.

At step 505, the pre-crash detection module 204 identifies a presence of the pre-crash event associated with the remote vehicle 140.

At step 507, the monitoring module 206 causes one or more sensors of the ego vehicle 123 to record sensor data.

At step 509, the monitoring module 206 generates, based on the senor data, remote-vehicle behavior data describing one or more behaviors of the remote vehicle 140.

At step 511, the monitoring module 206 monitors the remote vehicle 140 to continue receiving one or more second V2X wireless messages from the remote vehicle 140.

At step 513, the monitoring module 206 analyzes the sensor data to determine that the pre-crash event involves the remote vehicle 140 and an endpoint such as the endpoint 160.

Referring to FIG. 5B, at step 515, the monitoring module 206 generates, based on the sensor data, endpoint behavior data describing one or more behaviors of the endpoint 160 that are observed by the ego vehicle 123.

At step 517, the monitoring module 206 monitors the endpoint 160 to receive one or more third V2X wireless messages from the endpoint 160.

At step 518, the monitoring module 206 generates, based on the sensor data, condition data describing one or more pre-crash conditions that are observed by the ego vehicle 123.

At step 519, the collision determination module 208 detects that a collision occurs to the remote vehicle 140 based on one or more of the remote-vehicle behavior data and the one or more second V2X wireless messages.

At step 521, the collision determination module 208 determines that the endpoint 160 is involved in the collision with the remote vehicle 140 based on one or more of the one or more third V2X wireless messages and the endpoint behavior data.

At step 523, the report module 210 generates report data associated with the collision, where the report data includes one or more of: (1) a first set of V2X wireless messages including (i) the first V2X wireless message and the one or more second V2X wireless messages received from the remote vehicle 140 and (ii) the one or more third V2X wireless messages received from the endpoint 160; (2) the remote-vehicle behavior data; (3) the endpoint behavior data; and (4) the condition data.

Referring to FIG. 5C, at step 525, the report module 210 transmits the report data to the server 150.

At step 527, the modification module 212 receives modification data that describes a modification for a vehicle control system of the ego vehicle 123 from the server 150, where the modification data is generated based on the report data through a vehicular accident reconstruction analysis.

At step 529, the modification module 212 modifies an operation of the vehicle control system based on the modification data to improve safety of the ego vehicle 123.

Figure 6A:
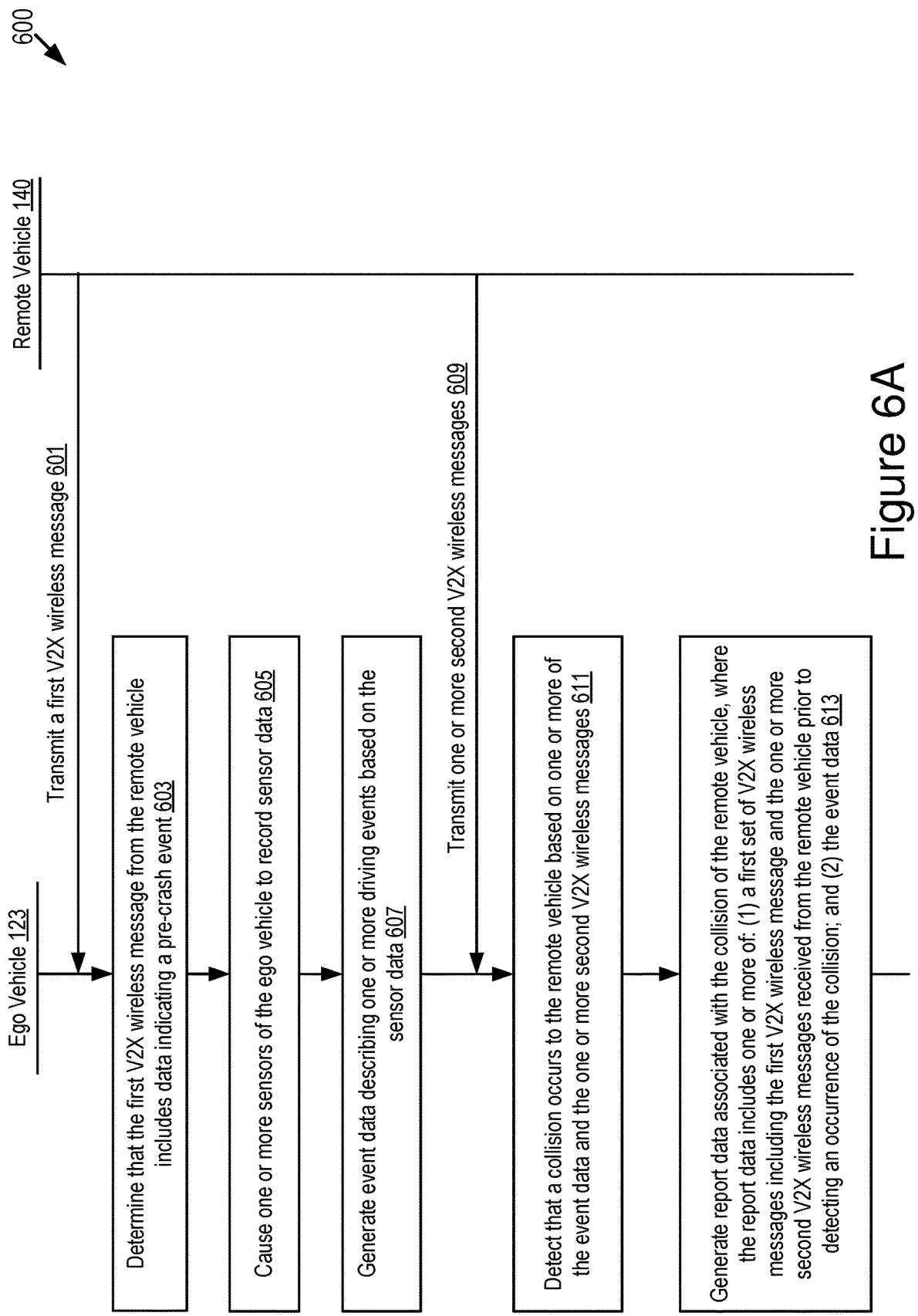

FIGS. 6A-6B depict an example flow process 600 for modifying a vehicle control system of a connected vehicle based on a result of a VAR analysis according to some embodiments. The steps of the flow process 600 are executable in any order, and not necessarily the order depicted in FIGS. 6A-6B. Here, assume that the connected vehicle is the ego vehicle 123.

Referring to FIG. 6A, at step 601, the remote vehicle 140 transmits a first V2X wireless message.

At step 603, the ego vehicle 123 receives the first V2X wireless message and determines that the first V2X wireless message from the remote vehicle 140 includes data indicating a pre-crash event.

At step 605, the ego vehicle 123 causes one or more sensors of the ego vehicle 123 to record sensor data.

At step 607, the ego vehicle 123 generates event data describing one or more driving events based on the sensor data.

At step 609, the remote vehicle 140 transmits one or more second V2X wireless messages.

At step 611, the ego vehicle 123 receives the one or more second V2X wireless messages and detects that a collision occurs to the remote vehicle 140 based on one or more of the event data and the one or more second V2X wireless messages.

At step 613, the ego vehicle 123 generates report data associated with the collision of the remote vehicle 140, where the report data includes one or more of: (1) V2X data describing a first set of V2X wireless messages including the first V2X wireless message and the one or more second V2X wireless messages received from the remote vehicle 140 prior to detecting an occurrence of the collision; and (2) the event data.

Referring to FIG. 6B, at step 615, the ego vehicle 123 transmits the report data.

At step 617, the server 150 executes a VAR analysis to generate VAR data describing one or more collision-causing events (e.g., one or more pre-crash behaviors of one or more parties involved in a collision and one or more pre-crash conditions) based on the first set of V2X wireless messages and the event data, where the one or more collision-causing events cause the collision. The one or more parties involved in the collision may include the remote vehicle 140 and the endpoint 160.

At step 619, the server 150 generates modification data that describes a modification for a vehicle control system of at least one of the one or more parties, where implementation of the modification in the vehicle control system would have resulted in the collision being avoided or made the collision less likely to occur.

At step 621, the server 150 transmits the modification data.

At step 623, the ego vehicle 123 receives the modification data and modifies an operation of the vehicle control system based on the modification data to improve safety of the ego vehicle 123. In some embodiments, other vehicles can also receive the modification data and modify an operation of their vehicle control systems based on the modification data respectively.

FIGS. 7A and 7B are graphical representations illustrating example BSM data 700 and 750 according to some embodiments. An example of information described by the BSM data 700 of a BSM message is shown below in FIG. 7A. The BSM is broadcast from vehicles over a 5.9 GHz DSRC band. A transmission range is on the order of 1,000 meters (or may be as large as 1,000 meters). The BSM includes two parts as shown in FIG. 7B.

The following is a summary of the content of FIG. 7B. Part 1 of the BSM data 750 includes core data elements, including a vehicle position, heading, speed, acceleration, steering wheel angle, and vehicle size. The BSM is transmitted at an adjustable rate of about 10 times per second.

Part 2 of the BSM data 750 includes a variable set of data elements drawn from an extensive list of optional elements. Some of them are selected based on event triggers, e.g., ABS activated. They are added to Part 1 and sent as part of the BSM message, but many are transmitted less frequently in order to conserve bandwidth. The BSM message includes only current snapshots (with the exception of path data which is itself limited to a few second's worth of past history data).

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method for an ego vehicle, comprising:
   generating report data associated with a collision of a remote vehicle, wherein the report data includes one or more of Vehicle-to-Everything (V2X) data describing a first set of V2X wireless messages received prior to an occurrence of the collision and event data describing one or more driving events that are observed by the ego vehicle;
   receiving modification data that describes a modification for a vehicle control system of the ego vehicle, wherein the modification data is generated based on the report data through a vehicular accident reconstruction analysis; and
   modifying an operation of the vehicle control system based on the modification data.

2. The method of claim 1, wherein the vehicle control system includes one of an Advanced Driver Assistance System (ADAS system) and an autonomous driving system.

3. The method of claim 2, wherein the ego vehicle is an autonomous vehicle and modifying the operation of the vehicle control system based on the modification data comprises:
   modifying a safety process of the autonomous vehicle which is provided by the autonomous driving system based on the modification data to increases safety of the autonomous vehicle.

4. The method of claim 2, wherein modifying the operation of the vehicle control system based on the modification data comprises:
   modifying one or more operations of one or more of a braking system, a steering system and an acceleration system of the ego vehicle based on the modification data, wherein the one or more operations are controlled by the ADAS system.

5. The method of claim 1, further comprising:
   identifying a presence of a pre-crash event associated with the remote vehicle based on a first V2X wireless message received from the remote vehicle;
   responsive to identifying the presence of the pre-crash event:
     causing one or more sensors of the ego vehicle to record sensor data;
     generating the event data describing the one or more driving events based on the sensor data; and
     monitoring the remote vehicle to continue receiving one or more second V2X wireless messages from the remote vehicle prior to detecting the occurrence of the collision,
     wherein the first set of V2X wireless messages included in the report data includes the first V2X wireless message and the one or more second V2X wireless messages; and
   detecting an occurrence of the collision associated with the remote vehicle.

6. The method of claim 5, wherein identifying the presence of the pre-crash event associated with the remote vehicle comprises:
   receiving an initial set of V2X wireless messages from a set of remote vehicles via a network, wherein the initial set of V2X wireless messages includes the first V2X wireless message from the remote vehicle; and
   analyzing the initial set of V2X wireless messages to identify that the first V2X wireless message includes data indicating the pre-crash event associated with the remote vehicle.

7. The method of claim 5, wherein detecting the occurrence of the collision associated with the remote vehicle comprises:
   detecting that the collision occurs to the remote vehicle based on one or more of the event data and the one or more second V2X wireless messages.

8. The method of claim 5, wherein the event data includes remote-vehicle behavior data describing one or more behaviors of the remote vehicle that are observed by the ego vehicle, and generating the event data describing the one or more driving events based on the sensor data further comprises:
   generating the remote-vehicle behavior data describing the one or more behaviors of the remote vehicle based on the sensor data.

9. The method of claim 8, wherein the one or more behaviors of the remote vehicle include one or more pre-crash behaviors of the remote vehicle that are observed by the ego vehicle.

10. The method of claim 5, wherein:
   prior to detecting the occurrence of the collision, the method further comprises:
     analyzing the sensor data to determine that the pre-crash event involves the remote vehicle and an endpoint; and
     monitoring the endpoint to receive one or more third V2X wireless messages from the endpoint; and
   generating the event data describing the one or more driving events based on the sensor data further comprises:

generating, based on the sensor data, endpoint behavior data describing one or more behaviors of the endpoint that are observed by the ego vehicle.

11. The method of claim 10, further comprising:
determining that the endpoint is involved in the collision with the remote vehicle based on one or more of the one or more third V2X wireless messages and the endpoint behavior data,
wherein the first set of V2X wireless messages included in the report data further includes the one or more third V2X wireless messages from the endpoint, and wherein the event data included in the report data further includes the endpoint behavior data.

12. The method of claim 10, wherein the one or more behaviors of the endpoint include one or more pre-crash behaviors of the endpoint that are observed by the ego vehicle.

13. The method of claim 1, wherein the event data included in the report data further includes one or more pre-crash conditions that are observed by the ego vehicle.

14. The method of claim 1, wherein each of the first set of V2X wireless messages is selected from a group that consists of: a Dedicated Short-Range Communication message; a Basic Safety Message; a Long-Term Evolution (LTE) message; a LTE-V2X message; a 5G-V2X message; and a millimeter wave message.

15. A system comprising:
an onboard vehicle computer system of an ego vehicle, including a communication unit, a processor and a non-transitory memory storing computer code which, when executed by the processor causes the processor to:
generate report data associated with a collision of a remote vehicle, wherein the report data includes one or more of Vehicle-to-Everything (V2X) data describing a first set of V2X wireless messages received prior to detecting an occurrence of the collision and event data describing one or more driving events that are observed by the ego vehicle;
receive modification data that describes a modification for a vehicle control system of the ego vehicle, wherein the modification data is generated based on the report data through a vehicular accident reconstruction analysis; and
modify an operation of the vehicle control system based on the modification data.

16. The system of claim 15, wherein the vehicle control system includes one of an Advanced Driver Assistance System (ADAS system) and an autonomous driving system.

17. The system of claim 16, wherein the ego vehicle is an autonomous vehicle and the computer code, when executed by the processor, causes the processor to modify the operation of the vehicle control system based on the modification data at least by:
modifying a safety process of the autonomous vehicle which is provided by the autonomous driving system based on the modification data to increases safety of the autonomous vehicle.

18. The system of claim 16, wherein the computer code, when executed by the processor, causes the processor to modify the operation of the vehicle control system based on the modification data at least by:
modifying one or more operations of one or more of a braking system, a steering system and an acceleration system of the ego vehicle based on the modification data, wherein the one or more operations are controlled by the ADAS system.

19. A computer program product comprising instructions that, when executed by a processor, causes the processor to perform operations comprising:
generating report data associated with a collision of a remote vehicle, wherein the report data includes one or more of Vehicle-to-Everything (V2X) data describing a first set of V2X wireless messages received prior to detecting an occurrence of the collision and event data describing one or more driving events that are observed by an ego vehicle;
receiving modification data that describes a modification for a vehicle control system of the ego vehicle, wherein the modification data is generated based on the report data through a vehicular accident reconstruction analysis; and
modifying an operation of the vehicle control system based on the modification data.

20. The computer program product of claim 19, wherein the vehicle control system includes an autonomous driving system, the ego vehicle is an autonomous vehicle and the instructions, when executed by the processor, causes the processor to modify the operation of the vehicle control system based on the modification data at least by:
modifying a safety process of the autonomous vehicle which is provided by the autonomous driving system based on the modification data to increases safety of the autonomous vehicle.

* * * * *